US006561938B1

United States Patent
Körner et al.

(10) Patent No.: US 6,561,938 B1
(45) Date of Patent: May 13, 2003

(54) HYDRODYNAMIC-MECHANICAL MULTI-SPEED COMPOUND TRANSMISSION, ESPECIALLY A SIX-SPEED TORQUE-CONVERTER TRANSMISSION

(75) Inventors: Tillman Körner, Zang (DE); Martin Nitsche, Gerstetten (DE); Martin Becke, Ulm (DE)

(73) Assignee: Die Voith Turbo GmbH & Co KG, Heidenheim (DE)

( * ) Notice: Subject to any disclaimer, the term of this patent is extended or adjusted under 35 U.S.C. 154(b) by 0 days.

(21) Appl. No.: 09/623,292

(22) PCT Filed: Mar. 8, 1999

(86) PCT No.: PCT/EP99/01479
§ 371 (c)(1),
(2), (4) Date: Nov. 2, 2000

(87) PCT Pub. No.: WO99/45296
PCT Pub. Date: Sep. 10, 1999

(30) Foreign Application Priority Data

Mar. 6, 1998 (DE) .......................... 198 09 464
Mar. 6, 1998 (DE) ..................... 298 03 793 U

(51) Int. Cl.$^7$ ............................................. F16H 47/08
(52) U.S. Cl. ................... 475/59; 475/282; 475/311; 475/317
(58) Field of Search ............... 475/59, 282, 311, 475/317, 60, 61, 62, 71

(56) References Cited

U.S. PATENT DOCUMENTS

| | | | |
|---|---|---|---|
| 4,191,072 A | * 3/1980 | Ehrlinger et al. | ............. 475/68 |
| 4,446,758 A | 5/1984 | Winzeler et al. | |
| 4,468,987 A | * 9/1984 | Miller | ......................... 475/127 |
| 4,497,219 A | * 2/1985 | Elsner | ......................... 475/113 |
| 4,823,641 A | 4/1989 | Kuhn et al. | |
| 4,869,128 A | 9/1989 | Ohkubo | |

FOREIGN PATENT DOCUMENTS

| | | | |
|---|---|---|---|
| DE | 35 17 142 A1 | 11/1985 | ............. F16H/3/64 |
| DE | 36 04 393 A1 | 8/1986 | ........... F16H/47/08 |
| DE | 36 04 393 C2 | 8/1986 | ........... F16H/47/08 |
| DE | 38 22 319 A1 | 1/1989 | ........... F16H/47/08 |
| WO | WO 96/41976 | 12/1996 | ........... F16H/37/04 |

OTHER PUBLICATIONS

Hohannes Looman, Zahnradgetriebe, Grundlagen, Konstruktionen, Anwendungen in Fahrzeugen (9 sheets).
M. Bucksch, Zf–5–gang–Automatgetriebe Fur PKW (5HP 18).
C. Nitescu, "Viergangplanetengetriebe Fur Personenkraftwagen Mit Dern Hydrodynamischen Drehmomentwandler in Leistungsverzweigung".
W. Klement, "Die Entwicklung Der Voith–Diwa–Getriebe".

* cited by examiner

Primary Examiner—Richard M. Lorence
Assistant Examiner—Ha Ho
(74) Attorney, Agent, or Firm—Randall J. Knuth

(57) ABSTRACT

The invention related to a hydrodynamic-mechanical multi-speed compound transmission has at least four speeds. The transmission includes a transmission input shaft and a transmission output shaft as well as a hydrodynamic transmission part. The hydrodynamic and the mechanical transmission parts are connected in series when seen from the power flow direction. Mechanisms are provided for by-passing the hydrodynamic transmission part during power transmission. The hydrodynamic transmission part includes at least one hydrodynamic speed-torque converter. The mechanical transmission part includes a mechanical speed-torque converting device with at least two planetary gear sets. The mechanical transmission part is designed in such a way that transmission ratios in the individual gear steps cause gear step jumps of phi $\leq 1.45$ between two successive gear steps of the individual speeds.

20 Claims, 14 Drawing Sheets

Shifting Matrix and Translations:

| Speed | Coupling | | Brake | | | | i |
|---|---|---|---|---|---|---|---|
| | K1 | K2 | B1 | B2 | B3 | B4 | |
| 1st | - | o | - | - | o | - | 3.08 |
| 2nd | - | o | - | - | o | o | 2.31 |
| 3d | - | - | o | - | - | - | 1.67 |
| 4th | o | o | o | - | - | o | 1.29 |
| 5th | o | - | - | - | - | - | 1.00 |
| 6th | o | - | - | o | - | o | 0.78 |
| R | - | o | - | - | - | - | -1.50 |

- = released
o = applied

Fig. 2

HYDRODYNAMIC-MECHANICAL MULTI-SPEED COMPOUND TRANSMISSION, ESPECIALLY A SIX-SPEED TORQUE-CONVERTER TRANSMISSION

BACKGROUND OF THE INVENTION

1. Field of the Invention

The invention is relative to a hydrodynamic-mechanical multispeed compound transmission with at least four speeds for use in vehicles, especially in busses, and also to a method of developing a transmission line from a basic transmission in the form of a hydrodynamic-mechanical multispeed compound transmission with at least four theoretically possible gear steps for use in vehicles for differing requirements.

2. Description of the Related Art

Hydrodynamic-mechanical compound transmissions comprising a hydrodynamic speed-torque converter and a mechanical transmission part are known in many embodiments. Publication DE 36 04 393 C2 discloses a hydrodynamic compound transmission comprising a torque converter and a gearbox connected together in series. The gearbox comprises two planetary gear trains. The planet carriers of the two planetary gear trains are coupled to each other and form the output of the gearbox. The number of required planet gear webs or planetary gear trains can be kept low with such an arrangement and the transmission can therefore be built short and three gear steps can be realized given the appropriate assignment of shifting devices. The hydrodynamic speed-torque converter comprises an impeller, a turbine gear and two stators or reactors—a first stator and a second stator. Means are provided that make possible a coupling of the turbine gear as well as of the first stator to the mechanical transmission part in the form of the gearbox. Specifically, the entire transmission input shaft can be coupled either via the hydrodynamic speed-torque converter and thereby via the turbine gear to the sun gear of the one planetary gear train of the mechanical transmission part or directly via a so-called bridge coupling to the latter. The first stator is connected via a freewheel to the sun gear of the second planetary gear train of the mechanical transmission part. The characteristic properties of the speed-torque converter in each range of the translation ratio and the translation ratio of the mechanical transmission part are changed by shifting the transmission path of the moment emanating from the first stator shaft, namely, by the selective actuation of the coupling- and/or braking devices that either make possible a fixing of the first stator shaft or a coupling of the first stator shaft to the turbine gear shaft and therewith of the first sun gear of the first planetary gear train. The advantage of the three-speed transmission described in this publication consists unambiguously in its small size and its low weight. However, an appropriate design of this existing transmission as regards the main instance of use or an expensive modification of the same is necessary for optimizing certain parameters, e.g., the fuel consumption of a vehicle or for making possible higher final design speeds of the vehicle.

SUMMARY OF THE INVENTION

The invention solves the problem of further developing a hydrodynamic-mechanical compound transmission of the initially cited type in such a manner that it can meet the existing requirements of use in an even more optimal manner retaining the advantages of the low weight and the small size. Depending on the intended use (e.g., for the use in busses for city traffic (use with low final design speeds) or primarily for overland traffic (use with high final design speeds), the following should be striven for: An optimal, that is, as hyperbola-shaped as possible, graph of tractive force, low fuel consumption and a selective useable speed number (4- or 5- or 6-speed transmission), depending on the final design speed) as well as an overdrive that is simple to realize for the last-named possibility of use. The transmission should be able to be universally used, that is, e.g., for busses with a low weight and a rather large weight (bandwidth weight $m_{min}$–$m_{max}$) as well as with different final design speeds (bandwidth final design speed $v_{min}$–$v_{max}$) without significant additional modification of transmission components and should make possible different areas of application and therewith different modes of operation, especially the starting variants.

The hydrodynamic-mechanical multispeed compound transmission with a hydrodynamic transmission part and a mechanical transmission part, have hydrodynamic transmission part and mechanical transmission part connected in series, viewed in the direction of the power flow, with at least means being provided for circumventing the hydrodynamic transmission part during the transmission of power, are designed in accordance with the invention as regards the mechanical transmission part in such a manner regarding the translations that at least one gear step jump or progression phi is achieved between two speeds adjacent to one another between 1.1 and 1.45. The hydrodynamic transmission part comprises at least one hydrodynamic speed-torque converter. The mechanical transmission part comprises a mechanical speed-torque conversion device with at least two planetary gear trains. The hydrodynamic-mechanical multispeed compound transmission is preferably equipped with a rear-mounted train (i.e., after-shifting- or secondary switching set) so that theoretically 6 gear steps are conceivable. It is particular advantageous in this case to design the mechanical transmission part in such a manner that the following gear step jumps phi are achieved:

phi≦1.45 between the first and the second gear step and the second and the third gear step;

phi≦1.35 between two successive gear steps of the following speeds.

Phi can remain constant thereby or can be designed to fall in the direction of higher speeds.

The design of the transmission in accordance with the invention makes it possible to attain as hyperbola-shaped as possible graph of tractive force in the tractive force/speed diagram even at low speeds. Moreover, different operating concepts with an optimal result as concerns different design speeds can be realized by an appropriate control of the individual transmission elements on account of this basic speed graduation. For example, when the transmissions are used in busses both the lower speed range, that is particularly significant for city buses, and the upper speed range, that constitutes the main range of use in travel buses, are considered thereby. Therefore, the gear step jumps in the upper speeds that is, from an initial speed into the next higher speed, are preferably designed to be constant, which corresponds to the customary design criteria in the upper speeds, especially in the case of transmissions for use in travel buses. In the case of lower design speeds (greater axial translations), the first speed (speed with the greatest translation), can remain uncontrolled as a result. The speed jump between converter speed and $2^{nd}$ speed remains below 1.8 therewith.

The mechanical transmission part is preferably designed in such a manner that the transmission elements in the first gear step that participate in the speed-torque conversion realize a translation in a range of 3<i<3.25 and in the last gear step a translation in a range of 0.7<i<0.9.

A plurality of control or drive variants can be realized on this basis with a basic transmission component without additional modification, which variants form the basis for the development of a series from a single basic transmission in the form of a hydrodynamic-mechanical multispeed compound transmission with at least four theoretically possible gear steps for use in vehicles for different requirements.

Specifically, the following can be achieved retaining the same basic transmission design by variation of the control of the transmission elements:

a) A plurality of transmission- and speed variants (4/5/6-speed),
b) A plurality of starting variants,
c) A plurality of drive variants by mixing the individual transmissions or speed variants with the individual start variants.

The individual speed variants are realized by omitting gear steps. The basic transmission concept is designed in such a manner that a plurality of gear steps, especially a maximum of 6 gear steps can be theoretically realized. The speed graduations in accordance with the invention are valid thereby for the design of the mechanical transmission part for a 6-speed transmission variant. The individual transmission variants are realized by omitting individual speeds. However, due to the association of the speeds with the individual mechanical gear steps, no change in the gear step jumps takes place thereby between the gear steps theoretically possible for the initial basic transmission. This means that gear steps can be omitted in such a manner from the sequence of individual gear and shifting steps possible for the basic transmission that can be theoretically inserted or used and that are characterized by the actuation and the uncoupling of the individual shifting devices for the individual speeds that, e.g., when the speed that is the first speed in the possible sequence of the shifting steps for the basic transmission is omitted, the first speed that is used corresponds to the second speed in the sequence of shifting steps theoretically set for the basic transmission. When gear steps are omitted, as a rule only the corresponding actuation for the speed change is eliminated.

The systematic elimination of the gear step that is always the greatest takes place thereby in such a manner that no intermediary gear steps are removed from the frequently used drive range but rather, depending upon the requirements of use, either the first speed, the last speed or a speed following or preceding it are removed. Achieving the elimination of gear steps by eliminating the rear-mounted train is consciously thereby avoided. Transmission variants with six speeds, a transmission variant with five speeds, and a transmission variant with four speeds can be realized in a multispeed compound transmission with six speeds. The individual transmission- and speed variants can either be basically offered from the beginning as a permanent transmission-or speed variant or can be freely selected and replaced when inserted in vehicles. Thus, in the first instance cited, the selection can be made by a customer already at the time of ordering the transmission, in which case this selection is then set for the further purposes of use. In the second instance the change of the speed variant permits a shifting of the area of application. Especially, when used in busses or in construction vehicles, for which different areas of application are required—in the case of buses their use in cities, overland travel and their use as travel buses and in the case of construction vehicles group operation as well as street operation—the possibility of making a free selection offers significant advantages as regards the driving behavior in the particular main area of application. Thus, it is conceivable, for example, to omit the first and sixth speed gear in a correspondingly designed multispeed compound transmission with six speeds in city traffic, which means starting in the second speed with no phi shift taking place due to the omission of the individual speeds. This means, in particular, that in the second speed, which is now used for starting, the mechanical transmission part is designed in such a manner that it experiences a gear step jump from the speed that is now the first of a magnitude of the one that takes place in the theoretically designed six-speed basic transmission between the first and the second speed. It should be considered for overland buses whether the first speed should be omitted from the transmission theoretically designed for six speeds as a result of which the second speed is used for starting and in particular the higher speed range, that represents a main area of application for overland buses, is used.

Based on the transmission design with the gear steps in accordance with the invention, different starting concepts with different goals, e.g., high available power or low fuel consumption, can be realized in a simple manner by different control variants of the individual transmission elements, in particular of the individual transmission elements for the individual gear steps and of the selection of the transmission of power by a hydrodynamic transmission part or by circumventing the hydrodynamic transmission part. Moreover, it is possible to cover a broad range of use with only one transmission.

The integration of a rear-mounted train, that is a component of the mechanical transmission part, in the basic transmission component consisting of a mechanical transmission part and a hydrodynamic transmission part makes multiple speeds possible, which for its part has the result that the operating area to be covered can be realized with a plurality of speeds, and preferably at least one overdrive or a so-called overdrive speed is provided. An optimal adaptation to the operation in the optimal fuel consumption range of the driving machine can be realized by means of the higher transmission spread total phi.

Based on the basic transmission component consisting of a mechanical transmission part and a hydrodynamic transmission part with a rear-mounted train and theoretically more than four speeds, a plurality of starting variants can be realized that make possible:

a) A thrifty drive behavior as regards consumption, or
b) An especially comfortable or, e.g., an especially performance-oriented drive behavior, or
c) A mixed form of all of the latter.

Even the starting variants can be stored as selectable variants in a transmission control and a control of the individual transmission elements takes place in accordance with the selection of the desired starting behavior.

A mechanical speed-torque converter is preferably used that comprises at least two planetary gear trains. A connection adapted to rotate in unison exists between a first element of the first planetary gear train and a second element of the second planetary gear train which connection simultaneously forms the input for the rear-mounted train. Their planet carriers are preferably coupled to each other and form the output of the mechanical speed-torque converter, which brings about a savings of space.

The hydrodynamic speed-torque converter preferably comprises two stator devices. A first stator is coupled thereby to the first planetary gear train of the mechanical speed-torque converter. A second stator of the hydrodynamic speed-torque converter is coupled via a freewheel to the transmission housing. The torques to be supported can be used to elevate the tractive force.

An example of an advantageous transmission design with the parameters of the invention is designed in detail as follows: the hydrodynamic transmission element comprises at least one impeller, one turbine gear and a stator device comprising a first stator and a second stator. The second stator is connected via a freewheel to the transmission housing. The first stator has a driving connection via a so-called stator shaft to the mechanical speed-torque converter. The mechanical speed-torque converter comprises at least two planetary gear trains, a first planetary gear train and a second planetary gear train. Each planetary gear train comprises a sun gear, a internal-geared wheel, planet gears and a planet carrier. The two planetary gear trains—the first planetary gear train and the second planetary gear train—are coupled together in such a manner that they rotate in unison. The first transmission element of the first planetary gear train, which is connected to a first transmission element of the second planetary gear train in such a manner that it rotates in unison with it, is preferably formed by the planet carrier of the associated planetary gear train. The two sun gears of the individual planetary gear trains, of the first planetary gear train and of the second planetary gear train, form the inputs of the mechanical speed-torque converter. The first input, that is coupled to the sun gear of the first planetary gear train, is connected via flywheel to the first stator of the hydrodynamic speed-torque converter. The sun gear of the second planetary gear train is preferably connected to the turbine gear shaft, that can be coupled either via the hydrodynamic speed-torque converter or the bridge coupling to the transmission input shaft. The hydrodynamic speed-torque converter is arranged in the transmission in such a manner that its turbine impeller can be fixed on the transmission housing whereas the rotor impeller is preferably coupled to the output of the mechanical speed-torque converter. This output is formed by the transmission elements, that are coupled to each other, of the two planetary gear trains, preferably in the present case of the coupling of the planet carriers. The output of the mechanical speed-torque converter forms the input of the mechanical rear-mounted step and is therewith coupled via the corresponding speed graduation to the transmission output shaft. The hydrodynamic retarder thus becomes active on the transmission output shaft via the rear-mounted step and exercises therewith the function of a secondary retarder. In addition, the rotor impeller of the hydrodynamic retarder experiences a translation by the rear-mounted step. The hydrodynamic retarder can be operated, relative to the speed of the output shaft, with two different translations over the entire operating range. In order to achieve the same braking moments, independently of the speed, the filling of the retarder must be greater when the rear-mounted group is translated into rapid speed then in the "direct translation" case. Depending on the shifting-back strategy, the filling must be adapted if all speeds are successively shifted back. The filling must not be adapted if a shifting back takes place only at every second speed. The coupling of the hydrodynamic retarder to the output shaft that takes place in this manner makes it possible to always realize optimal braking procedures and achieve an optimal braking behavior.

In order to realize the individual gear steps, shifting devices in the form of braking devices and coupling devices are provided that are preferably designed with a laminar construction. The individual shifting devices are to be actuated in accordance with the desired speed to be used and the translation obtainable thereby. To this end a transmission control is preferably provided. A first braking device serves to brake the stator shaft and therewith the sun gear of the first planetary gear train. A second braking device serves to brake the internal-geared wheel of the first planetary gear train and a third braking device to brake the internal-geared wheel of the second planetary gear train of the mechanical speed-torque converter. A further, fourth braking device serves to brake the sun gear of the rear-mounted step. A first coupling element serves to realize the connection, adapted to rotate in unison, of the sun gear of the first planetary gear train and of the sun gear of the second planetary gear train. The control of the individual shifting devices makes possible different gear steps and, in combination with the selection of the transfer of power via the hydrodynamic transmission part or under circumvention of the hydrodynamic transmission part, different modes of operation, especially starting programs. In the preferred embodiment, the second element of the first planetary gear train can be braked by a first braking device, a third element of the first planetary gear train by means of a second braking device and a third transmission element of the second planetary gear train by means of a third braking device. The shifting elements designed as braking devices and/or coupling devices are preferably designed with a laminar construction.

The rear-mounted train comprises at least one planetary gear train comprising a sun gear, a internal-geared wheel, planet gears and a planet carrier. The input of the planetary gear train is formed thereby by the planet carrier of the planetary gear train and the output by the internal-geared wheel of the planetary gear train. The planetary gear train is associated with a further, fourth braking device and a further, second coupling device, the fourth braking device can be coupled to the sun gear of the planetary gear train. The second coupling device serves to couple the sun gear to the planet carrier of the planetary gear train.

The rear-mounted step serves in the present instance to split the three shifting stages that can be realized with the basic transmission into two partial stages. This means that the individual, successive speeds can be realized with actuation of the same shifting elements in the basic transmission, that is, the mechanical speed-torque converter, by alternately actuating the appropriate shifting devices, coupling- and/or braking devices in the rear-mounted step. Two successive speeds, viewed from the first speed, are thus distinguished substantially by actuating the same shifting devices in the basic transmission. The transfer of power can take place thereby via the hydrodynamic transmission part or while circumventing it, as desired. As a rule, the mechanical drive-through is shifted in speeds 3, 4, 5 and 6 with circumvention of the hydrodynamic speed-torque converter. In speeds 1 and 2 the transmission of power takes place via the converter too. According to the invention the designing of the mechanical transmission part takes place in such a manner that gear step jumps are realized in the individual 6 speeds of phi$\leq$1.45 between the first and the second speed and between the second and the third speed and phi$\leq$1.35 between two successive gear steps of the following speeds with the latter, i.e., the mechanical transmission part, without taking the hydrodynamic speed-torque converter into consideration.

In the rear-mounted step of the preferred embodiment the fourth braking device and the second coupling device are actuated alternately in successive speeds. Specifically, the following shifting devices are actuated in the individual speeds whereas the remaining shifting devices are uncoupled, i.e., released:

$1^{st}$ speed: Second coupling device and third braking device $2^{nd}$ speed: Third and fourth braking device $3^{rd}$ speed: Second coupling device and first braking device $4^{th}$ speed: First and third braking device $5^{th}$ speed: First and second coupling device $6^{th}$ speed: First coupling device and fourth braking device.

The following starting variants result in detail for the preferred embodiment of the hydrodynamic-mechanical compound transmission, which starting variants differ essentially by the number of shifting operations and their influence on the operating range of the drive machine. The different starting variants result from the realization of the transmission of power via the speed-torque converter or with circumvention of the speed-torque converter in the individual gear steps. The individual gear step is determined thereby by actuating the switching devices on the mechanical speed-torque converter without taking the rear-mounted train into consideration. The shifting elements of the rear-mounted train are actuated in such a manner for realizing variants that the particular gear translation is set.

Only possible starting variants are described in the flowing, taking no consideration of the shifting of all further speeds. The subsequent speed can be shifted in the same manner.

Variant 1: Four Shifting Operations

Transmission of power via the hydrodynamic speed-torque converter in the first speed onto the mechanical speed-torque converter (that is, actuation of shifting elements as in the first gear, with the shifting elements of the rear-mounted train actuated in such a manner that only the greater translation is set).

Transmission of power from the transmission input shaft with circumvention of the hydrodynamic transmission part, especially of the hydrodynamic speed-torque converter, onto the mechanical speed-torque converter upon actuation of the shifting elements in the first gear by putting in operation the converter bridge coupling and the through coupling.

Transmission of power via the hydrodynamic speed-torque converter in the second gear, that is, actuation of the shifting elements around the mechanical speed-torque converter as in the second gear and uncoupling of the through coupling.

Transmission of power from the transmission input shaft with circumvention of the hydrodynamic speed-torque converter upon actuation of the shifting elements in the second gear and, e.g., actuation of the converter bridge coupling.

Transfer of power from the transmission input shaft under circumvention of the hydrodynamic speed-torque converter upon actuation of the shifting elements in the third gear.

Variant 2: Three Shifting Operations

Transfer of power via the hydrodynamic speed-torque converter in the first gear onto the mechanical speed-torque converter (that is, actuation of the shifting elements as in the first gear, with the shifting elements of the rear-mounted train actuated in such a manner that only the greater translation is set).

Transmission of power from the transmission input shaft with circumvention of the hydrodynamic transmission part, especially of the hydrodynamic speed-torque converter, onto the mechanical speed-torque converter upon actuation of the shifting elements in the first gear and the lock-up coupling.

Transmission of power from the transmission input shaft under circumvention of the hydrodynamic speed-torque converter upon actuation of the shifting elements in the second gear.

Transmission of power from the transmission input shaft under circumvention of the hydrodynamic speed-torque converter upon actuation of the shifting elements in the third gear.

All other higher speeds can be shifted in the same manner.

Variant 3: Three Shifting Operations

Transmission of power via the hydrodynamic speed-torque converter in the first gear onto the mechanical speed-torque converter (that is, actuation of the shifting elements as in the first gear, with the shifting elements of the rear-mounted train actuated in such a manner that only the greater translation is set).

Transfer of power via the hydrodynamic speed-torque converter in the second gear onto the mechanical speed-torque converter (that is, actuation of the shifting elements as in the second gear, with the shifting elements of the rear-mounted train actuated in such a manner that only the smaller translation is set).

Transmission of power from the transmission input shaft under circumvention of the hydrodynamic transmission part, especially of the hydrodynamic speed-torque converter, onto the mechanical speed-torque converter upon actuation of the shifting elements in the second gear (rear-mounted train small translation).

Transmission of power from the transmission input shaft with circumvention of the hydrodynamic speed-torque converter upon actuation of the shifting elements in the third gear.

Variant 4: Two Shifting Operations

Transmission of power via the hydrodynamic speed-torque converter in the first gear onto the mechanical speed-torque converter (that is, actuation of the shifting elements as in the first gear, with the shifting elements of the rear-mounted train actuated in such a manner that only the greater translation is set).

Transmission of power via the hydrodynamic speed-torque converter in the second gear onto the mechanical speed-torque converter (that is, actuation of the shifting elements as in the second gear, with the shifting elements of the rear-mounted train actuated in such a manner that only the smaller translation is set).

Transmission of power from the transmission input shaft with circumvention of the hydrodynamic speed-torque converter upon actuation of the shifting elements in the third gear.

Variant 5: Two Shifting Operations

Transmission of power via the hydrodynamic speed-torque converter in the first gear onto the mechanical speed-torque converter (that is, actuation of the shifting elements as in the first gear, with the shifting elements of the rear-mounted train actuated in such a manner that only the greater translation is set).

Transmission of power from the transmission input shaft with circumvention of the hydrodynamic speed-torque converter upon actuation of the shifting elements in the second gear.

Transmission of power from the transmission input shaft with circumvention of the hydrodynamic speed-torque converter upon actuation of the shifting elements in the third gear.

Variant 6: Three Shifting Operations

Transmission of power via the hydrodynamic speed-torque converter in the second gear onto the mechanical speed-torque converter (that is, actuation of the shifting elements as in the second gear, with the shifting elements of the rear-mounted train actuated in such a manner that only the smaller translation is set).

Transmission of power from the transmission input shaft with circumvention of the hydrodynamic transmission part, especially of the hydrodynamic speed-torque converter, onto the mechanical speed-torque converter upon actuation of the shifting elements in the first gear.

Transmission of power from the transmission input shaft with circumvention of the hydrodynamic transmission part, especially of the hydrodynamic speed-torque converter, onto the mechanical speed-torque converter upon actuation of the shifting elements in the second gear.

Transmission of power from the transmission input shaft with circumvention of the hydrodynamic speed-torque converter upon actuation of the shifting elements in the third gear.

Variant 7: Two Shifting Operations

Transmission of power via the hydrodynamic speed-torque converter in the second gear onto the mechanical speed-torque converter (that is, actuation of the shifting elements as in the second gear, with the shifting elements of the rear-mounted train actuated in such a manner that only the smaller translation is set).

Transmission of power from the transmission input shaft with circumvention of the hydrodynamic transmission part, especially of the hydrodynamic speed-torque converter, onto the mechanical speed-torque converter upon actuation of the shifting elements in the second gear.

Transmission of power from the transmission input shaft with circumvention of the hydrodynamic speed-torque converter upon actuation of the shifting elements in the third gear.

Variant 8: One Shifting Operation

Transmission of power via the hydrodynamic speed-torque converter in the second gear onto the mechanical speed-torque converter (that is, actuation of the shifting elements as in the second gear, with the shifting elements of the rear-mounted train actuated in such a manner that only the smaller translation is set).

Transmission of power from the transmission input shaft with circumvention of the hydrodynamic speed-torque converter upon actuation of the shifting elements in the third gear.

Variants 1,2,5 and 6 represent economical programs whereas variants 3,4,5 and 8 make possible a comfortable mode of operation. The starting variants are to be selected in accordance with the desired effect. The conversion in accordance with the apparatuses takes place as a rule via a transmission control device or regulating device that can be integrated in the central drive control of the vehicle or is at least coupled to it and in this manner an optimal engine-transmission management can be realized in accordance with the requirements of use under very varied borderline conditions.

Based on this six-speed design, the possibility of selecting different transmission variants can also be made available in accordance with the requirement of use. These variants can be firmly predefined upon ordering, as already mentioned above, or can be made available in a freely selectable manner. There is the possibility in the present instance of converting the multispeed compound transmission with the theoretically six possible gear steps into a multispeed compound transmission with four or five gear steps without having to change anything in the design of the transmission. The transmission unit can be realized in accordance with the advantageous design described and the individual transmission variants are realized solely by controlling the individual transmission elements and changing the course of the progression and the sequence of the control of the transmission elements. In particular, individual gear graduations are eliminated. However, the elimination does not take place in the main areas of use, that is, no middle gear steps or speeds are removed but rather the smallest or the largest gear steps are preferably eliminated. Solely the actuations in these gear stages to be eliminated are no longer performed thereby in accordance with the shifting [switching] plan so that the latter remain associated with the theoretically six possible speeds as regards the actuation of the individual shifting devices and thus the gear graduations do not depend on the shifted gear steps but rather on the original six theoretical or selected gear steps. If, for example, the theoretical first and the sixth speed are eliminated for the use of the transmission in a city bus, the bus will start in the theoretical second speed and the gear graduation between the starting procedure and the next-following procedure corresponds to the gear graduation of the theoretical speed or gear, that is, of the transition from the second into the third speed.

The possibility of selecting the transmission variants (4-, 5-, 6-speed transmission) is preferably offered under the aspect of universality in combination with the possibility of selecting the starting variants (economical drive mode, comfortable drive mode, performance-oriented drive mode). As concerns the devices, the transmission unit can be associated with a control device that is either a component of the transmission unit, and is therefore directly associated with the latter, or that can be integrated in a central drive control. A further conceivable possibility is to place these individual possibilities in the control device associated with the transmission in which instance, as regards the modification concerning the cooperation with different drive machines, the individual starting variants and transmission variants can be fixed by means of appropriate performance characteristics or mapping for the individual possible drive machines and requirements of use and when incorporated into a vehicle, the drive control takes this data directly from the transmission.

However, a possibility of selecting the actuation of the individual shifting devices as regards the sequence and the progression is preferably always provided in order to expand therewith the spectrum of use of the vehicle in which this transmission is built. The concrete constructive and component conversion is in the area of activity of a competent expert, given knowledge of this basic concept of the invention.

The design of the invention is explained below with reference made to the figures.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 shows the shifting scheme for theoretically six possible speeds or gears for a transmission in accordance with FIG. 1.

FIGS. 3a to 3h illustrate tractive force diagrams for different starting variants with a transmission according to FIG. 1 designed in accordance with the invention.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
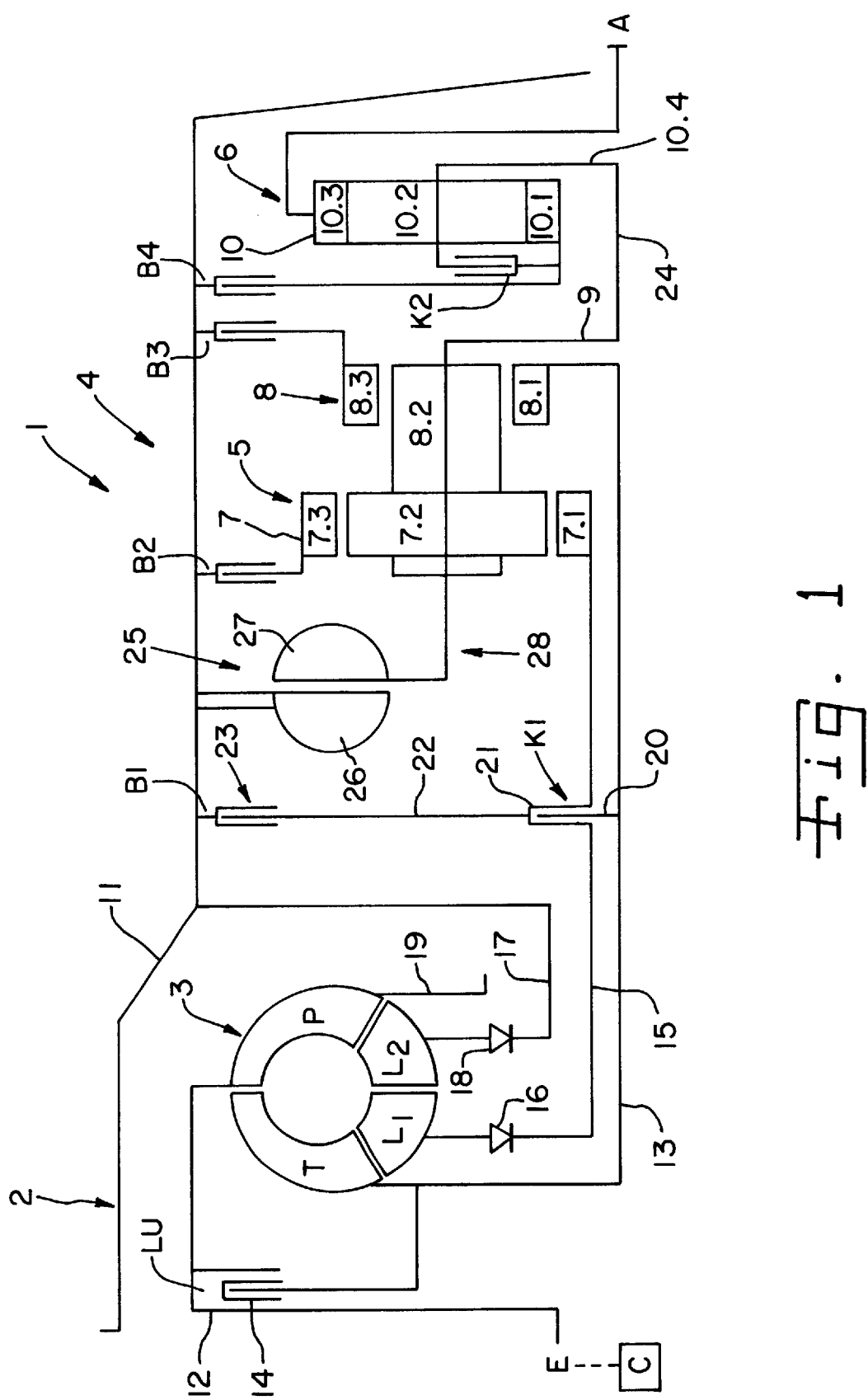
FIG. 1 illustrates in a schematically simplified view the basic design of a preferred embodiment of a hydrodynamic-mechanical compound transmission with gear steps in accordance with the invention.

FIG. 1 illustrates by way of example an advantageous embodiment of a hydrodynamic-mechanical compound transmission 1 designed in accordance with the invention. Hydrodynamic-mechanical, compound transmission 1 comprises a first hydrodynamic transmission part 2 in the form of a hydrodynamic speed-torque converter and a second mechanical transmission part 4. Mechanical transmission part 4 comprises mechanical speed-torque converter 5 and a range or group train connected at the outlet side of the latter in the direction of the flow of power in tractive operation. Mechanical speed-torque converter 5 is designed as a Ravigneaux-type planetary gear train. The latter comprises a first planetary gear train 7 and a second planetary gear train 8 that comprise planetary gear carrier 9 used in common. The first planetary gear train 7 comprises sun gear 7.1, planet gears 7.2 and internal-geared wheel 7.3. The second planetary gear train 8 comprises sun gear 8.1, planet gears 8.2 and internal-geared wheel 8.3. Planet gears 8.2 participate in both planetary gear trains.

Range train 6 comprises at least one planetary gear train 10 that comprises sun gear 10.1, planet gears 10.2, internal-geared wheel 10.3 and web or land 10.4.

Hydrodynamic-mechanical speed-torque converter 3 comprises turbine gear T, impeller P, a first stator L1 and a second stator L2 and is covered by housing 11. Impeller P is preferably connected by transmission input shaft E, that can be coupled at least indirectly to a drive machine serving for the drive, to flywheel 12 of an internal combustion machine in such a manner that the power from flywheel 12 is transferred to impeller P. Turbine gear T is connected to turbine gear shaft 13 in such a manner that it rotates in unison with it. In order to utilize the advantages of the hydrodynamic transmission of torque with lock-up, that is, bridge coupling, that would be in the following:

Automatic, continuously variable adjustment of the ratio between the drive speed and the output speed in accordance with the load on the output side;

Making the maximum torque available for a starting operation or operation of acceleration based on the greatest torque conversion at standstill of the turbine gear;

The possibility of removing heat by foreign- or surface cooling;

Separation of the hydrodynamic speed/torque converter from the output at idling speed and transmission of a slight residual torque a couple so that a choking off the drive machine from the output side is not possible and the fuel consumption is kept low;

Wear-free transmission of power and at the same time avoiding the disadvantages of a hydrodynamic transmission of power that substantially exists in an output that can often not be sufficiently achieved, in order to be able to operate solely with a hydrodynamic transmission, since power dissipation components composed of friction losses and impact losses reduce the total transmittable power and since the attained conversion ranges are often insufficient for the use of the vehicle, hydrodynamic speed/torque converter 3 is only used in the lower gear steps, preferably only during the starting procedure, for the transmission of power. Therefore, in order to improve the transmission output hydrodynamic speed-torque converter 3 is taken out of the transmission of power, preferably by bridging. To this end bridge coupling 14 is arranged between turbine gear T and flywheel 12 and the transmission input shaft.

The first stator L1 is arranged on the turbine side between turbine gear T and impeller P and is mounted by a freewheel. The first stator L1 can be connected to a first stator shaft 15 in such a manner that it can rotate in unison with it. Freewheel 16 is provided between the first stator and stator shaft 15 and is designed in such a manner that it transfers a torque onto the first stator shaft 15 when the first stator L1 rotates in the reverse direction, that is, that is the opposite direction of rotation to turbine gear T. This freewheel idles when the first stator L1 rotates in the normal direction, that is, in the same direction of rotation as turbine gear T. The second stator L2 and is arranged between turbine gear T and impeller P on the pump side and can be coupled via a second impeller shaft 17 to housing 11. A second freewheel 18 is arranged between the second stator L2 and the second stator shaft 17 by means of which freewheel the second stator L2 and can be coupled to the second stator shaft 17; but only when the second stator L2 is rotating in the direction opposite turbine gear T.

Impeller P is connected to impeller shaft 19 in such a manner that it can rotate in unison with it. This impeller shaft is rotatably mounted via a bearing in housing 11.

In order to realize the individual gear steps and the design of the individual speeds, shifting elements are associated with the individual elements of hydrodynamic-mechanical compound transmission 1. A first coupling device K1 and a second braking device B1 are provided between hydrodynamic transmission part 2 and mechanical transmission part 4.

Turbine gear T and turbine shaft 13, that can be coupled to gear T in such a manner that it can rotate in unison with it, are coupled to sun gear 8.1 of the second planetary gear train 8 of mechanical speed/torque converter 5. Turbine gear T and sun gear 8.1 of the second planetary gear train are preferably arranged on a common shaft, here turbine gear shaft 13. Turbine gear shaft 13 also carries the coupling clutch disk 20 of first coupling K2. Moreover, first coupling K1 comprises a coupling via clutch linings on stator shaft 15. In addition, first stator L1 can be connected via first stator shaft 15 to sun gear 7.1 of first planetary gear train 7 of mechanical speed/torque converter 5. Coupling covering 21 is preferably connected in a single piece thereby to first stator shaft 15. First stator shaft 15 is designed as a hollow shaft surrounding stator shaft 13 in the circumferential direction.

A preferably disk-shaped element 22 is connected to coupling covering 21 of first coupling K1 and forms a structural unit with the latter on whose outer circumferential area 23 the first braking device B1 can attack. First braking device B1 serves to fix first stator L1 via stator shaft 15 and/or to fix first sun gear 7.1 of first planetary gear train 7 of mechanical speed/torque converter 5. Other shifting elements, here the shifting elements in the form of braking devices B2 and B3, are associated with the individual planetary gear trains 7 and 8 of mechanical speed-torque converter 5. In the instance presented the second braking element B2 is associated with internal-geared wheel 7.3 of first planetary gear train 7 and the third braking element B3 is associated with internal-geared wheel 8.3 of second planetary gear train 8 of mechanical speed-torque converter 5. The coupling of mechanical speed/torque converter 5 to transmission input shaft E by hydrodynamic speed-torque converter 3 and its bridge via bridge coupling 14 takes place thereby by coupling turbine gear T and turbine gear shaft 13 to a first transmission element of mechanical speed-torque converter 5 and by coupling first stator L1 to a further, second transmission element of mechanical speed-torque converter 5. Sun gear 8.1 of second planetary gear train 8 functions here as the first transmission element of mechanical speed-torque converter 5. Sun gear 7.1 of first planetary gear train 7 functions as the second transmission element. The shafts coupled to the two sun gears 7.1 and 8.1, here first stator shaft 15 and turbine gear shaft 13, function as input shafts of mechanical speed/torque converter 5. A further, third transmission element is connected via range or group train 6 to transmission output shaft A. Planet carrier 9, that is used in common by both planetary gear trains 7 and 8, functions as the third transmission element. The third transmission element of mechanical speed-torque converter 5 is connected to the input formed by a first transmission element of the range train or of splitter unit 6. This connection is preferably realized by a coupling, rotating in unison, of the third transmission element of mechanical speed-torque converter 5 and the first transmission element of range train 6. Both are preferably arranged on common connecting shaft 24. The first transmission element of range train 6 is formed by its planet carrier 10.4. A second transmission element of range train 6 is connected to transmission output shaft A of hydrodynamic-mechanical compound transmission 1 in such a manner that it can rotate in unison with it. In the instance presented internal-geared wheel 10.3 of planetary gear train 10 of range train 6 functions as the second transmission element. While mechanical speed-torque converter 5 serves in combination with hydrodynamic speed-torque converter 3 for the realization of three gear steps, six gear steps can be realized by the combination of hydrodynamic speed-torque converter 3 and of mechanical speed-torque converter 5 with range train 6 in the instance presented. To this end range train 6 is associated with a further coupling device, here the second coupling device K2 and with a further braking device, here the fourth braking device B4. The fourth braking element serves thereby to brake sun gear 10.1 of range train 6. The second coupling device K2 makes possible the rigid coupling between planet carrier 10.4 and sun gear 10.1 of planetary gear train 10 of range train 6. A hydrodynamic retarder 25 is arranged adjacent to range train 6 in transmission 1. This retarder assumes the function of a secondary retarder here, that is, for the retardation of the transmission output shaft. However, hydrodynamic retarder 25 is arranged spatially in front of range train 6, viewed in the direction of the power flow in tractive operation. Hydrodynamic retarder 25 is integrated therewith in hydrodynamic-mechanical compound transmission 1 in transmission housing 11. Hydrodynamic retarder 25 comprises stationary stator impeller 26 that is connected in the present instance firmly to the frame of housing 11. Moreover, hydrodynamic retarder 25 comprises a rotor impeller 27 coupled to the output of mechanical speed-torque converter 5 and to the input of range train 6. This means in the present instance that rotor impeller 27, planet carrier 9 and planet carrier 10.4 can be coupled to each other in such a manner that they can rotate in unison, preferably arranged on a common shaft designated here with 28.

The spatially close arrangement of hydrodynamic retarder 25 and of hydrodynamic speed-torque converter 3 make it possible to arrange the required structural elements for supplying operating media to the hydrodynamic components that are likewise spatially close to each other in transmission 1. The required operating media lines can be made very short and in particular the same operating media supply lines can be used for hydrodynamic retarder 25 as well as for hydrodynamic speed-torque converter 3. This statement also applies analogously to the required cooling circuits, that can be directly associated with the operating media supply circuits and are preferably coupled via a common heat exchanger to each other. The constructive design of the transmission with hydrodynamic retarder 25 integrated in the transmission and with the function of secondary retarder and with the range train makes possible a compact transmission design suitable in particular for realizing a modular system.

The individual elements of the operating media supply system, e.g., operating media supply lines, gear pumps, heat exchanger, can also be integrated in the transmission housing. In addition, the short line design has the advantage of a low hydrodynamic flow resistance as well as the diminution of the reaction times of the hydrodynamic structural components, especially of hydrodynamic retarder 25 and hydrodynamic speed-torque converter 3. This can significantly increase the degree of energetic efficiency as regards the hydrodynamic components.

The present constructive design of the mechanical-hydrodynamic compound transmission 1 represents an advantageous variant. Specifically, it is possible as a result of the modular joining together to combine a basic transmission, comprising hydrodynamic transmission part 2 and mechanical speed-torque converter 5 of mechanical transmission part 4, to any desired range train 6 by joining, in particular flanging range train 6 solely on the output of the basic transmission. Moreover, no significant additional expense is required to integrate hydrodynamic retarder 25 in front of the range train, preferably also in front of the mechanical speed-torque converter in the transmission housing.

The individual shifting devices K1, K2 and B1 to B4 are preferably manufactured with a lamellar construction. However, other embodiments are also conceivable.

FIG. 2 illustrates a possible mode of operation of the transmission described in FIG. 1 using a shifting scheme.

In the first gear step third braking element B3 is actuated while the other braking elements and couplings in mechanical speed-torque converter 5, second braking element B2, first braking element B1 and first coupling element K1 are not actuated or released. Thus, only internal-geared wheel 8.3 of the second planetary gear train on housing 11 is braked whereas the other planetary gear trains of mechanical speed-torque converter 5 mesh with each other and form a unit. First stator L1 acts in the low-gear speed range controlled by the operating mode of the first gear step in a reversing manner via speed-torque converter 5 on the web and reinforces the output torque. In range train 6, the first coupling device K2 is actuated in this gear step. This makes it possible that internal-geared wheel 10.3 is driven at the same speed as web 10.4, that is, the result is that a translation in the range shifting train of 1 is achieved. The shifting into the second gear stage takes place by releasing or disengaging second coupling device K2 and actuating fourth braking device B4. As the speed ratio increases, a shift is made to the third gear step by an automatic control. In this instance, the third braking element is put out of operation and first braking element B1 is actuated. Moreover, first coupling device K1 and fourth braking element B4 are out of operation and second coupling device K2 is actuated. First stator shaft 15 and sun gear 7.1 of the first planetary gear train of mechanical speed-torque converter 5 are thus braked against housing 11. If the vehicle is driven without converter bridge coupling, very high tractive forces result as in the first gear since the stator torque acts as drive torque via the web of the planet gear train. The torques of hydrodynamic speed-torque converter 3 thus develop greater tractive forces in the first and the second gear. The transmission of power from mechanical speed-torque converter 5 takes place via further speed-torque conversion via range train 6 onto output shaft A of mechanical-hydrodynamic compound transmission 1. The shifting into the fourth gear step takes place by releasing fourth braking device B4 and actuation second coupling device K2. The shifting devices in the basic transmission remain actuated analogously to the third gear step. As the speed ratio is further increased a change into the fifth gear step takes place. In the fifth gear step only the first coupling device and the second coupling device K1 and K2 are actuated. Turbine shaft 13 rotates in this instance in an analogous manner in the same direction as first stator shaft 15. In the sixth gear step the second coupling device K2 is released and the fourth braking device B4 actuated. The power is transferred in speed 6 directly from transmission input shaft E onto turbine shaft 13 and therewith onto mechanical speed-torque converter 5.

As a rule, when the speed ratio is increased the bridging of hydrodynamic speed-torque converter 3 takes place by means of bridge coupling 14. The power is then transmitted directly from transmission input shaft E onto turbine shaft 13 and therewith onto mechanical speed-torque converter 5. The hydrodynamic speed-torque converter is thus used only in the $1^{st}$ and $2^{nd}$ speed.

The three basic gear stages are thus split by range train 6 into two partial gear steps so that in the end a multispeed transmission is created, in the present instance a six-speed transmission. Specifically, this is realized by the alternating actuation of the shifting devices on range train 6. In the first of the two partial gear steps the power from mechanical speed-torque converter 5 on its output shaft is transmitted with a translation ratio of 1 onto transmission output shaft A. In the second partial gear step, that follows the particular first partial gear step, a translation takes place from the speed present at the output of mechanical speed-torque converter 5 via range train 6 into high gear.

The design of a mechanical, hydrodynamic compound transmission 1 shown in FIGS. 1 and 2 represents an advantageous exemplary embodiment. However, the arrangement and design of the mechanical speed-torque converter and/or of range train 6 can also take place in some other manner. Hydrodynamic retarder 25, that is connected to output shaft A of transmission 1 via range train 6, thus also needs to be adapted as regards its degree of filling in accordance with the shifting philosophy only at every second shifting. This means that the degree of filling has to be regulated only at each second speed.

In order to achieve speed-independent, equal braking torques, the filling of the retarder must be greater at the translation of the rear-mounted unit [r-m range unit, section] into high gear than at the "direct translation" of 1.0. Depending on the downshift strategy, the filling must be adapted if all speeds are downshifted in succession. The filling does not have to be adapted if a downshift occurs only at every second speed.

FIGS. 3a to 3d illustrate the tractive force diagrams for different starting variants for different effects. Only the tractive force courses of the starting variants provided in accordance with the invention are shown in an amplified manner. The designations $1^{st}$, $2^{nd}$, $3^{rd}$, $4^{th}$, $5^{th}$, and $6^{th}$ are used to represent the six respective gear levels. The designations $1^{st}$ TC, $2^{nd}$ TC, $1^{st}$ LU, $2^{nd}$ LU, $3^{rd}$ LU, correspond to the first torque converter; the second torque converter; and first through third lock-up clutches, respectively.

Figure 3A:
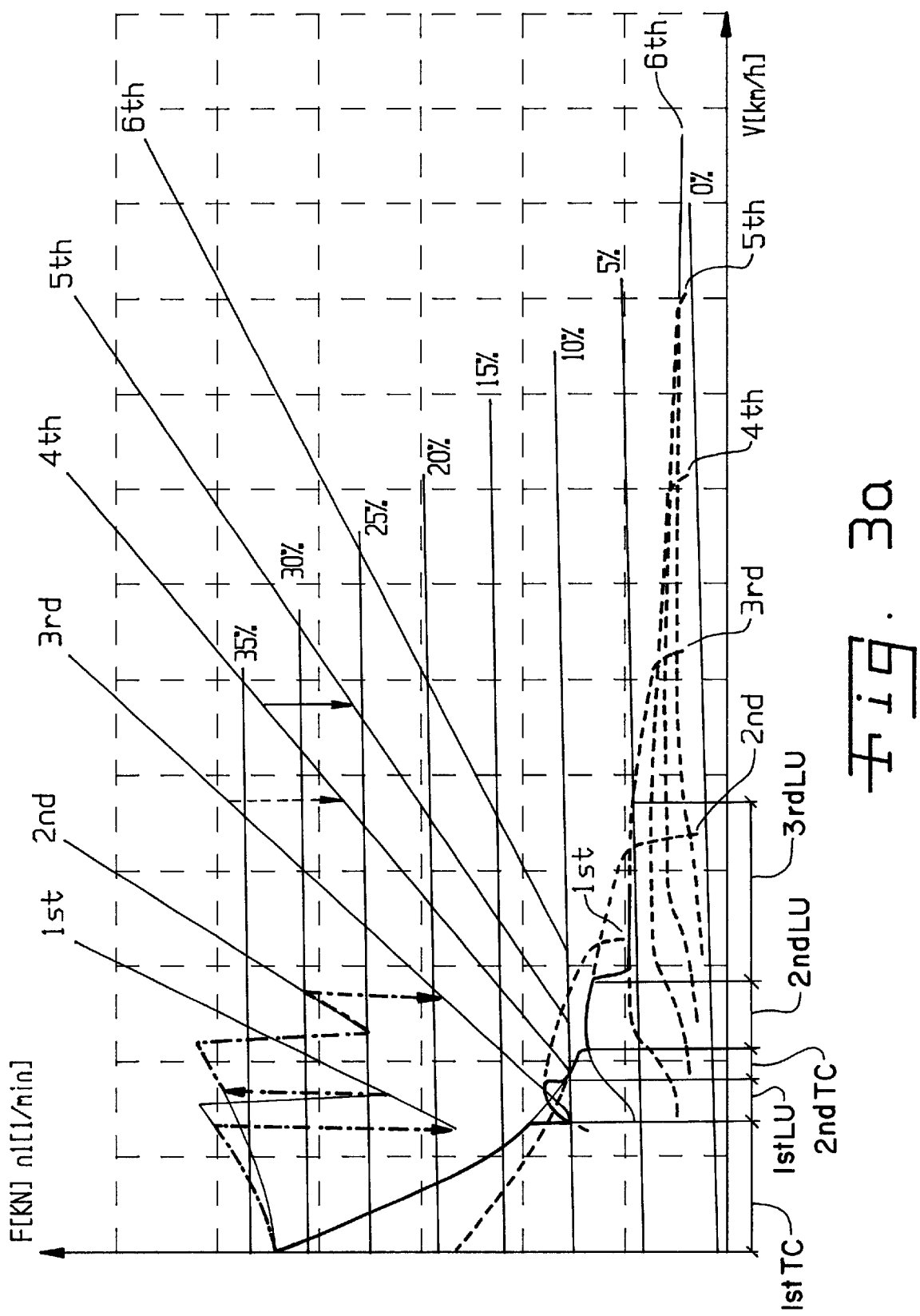

FIG. 3a illustrates the course of tractive force, using the tractive force/speed diagram, for the first starting variant as it is used primarily for use in overland buses. Four shifting operations are required in this variant in order to make a high starting tractive force available in the lower speed range and to achieve the middle speed range. The second coupling device is actuated in the range train or rear-mounted train for the starting operations. The transmission of power takes place thereby at first via the hydrodynamic speed-torque converter in the first gear onto the mechanical speed-torque converter (that is, actuation of the shifting elements as in the first gear, during which the shifting elements of the rear-mounted train are actuated in such a manner that only the particular greater translation is adjusted), then the transfer of power takes place from the transmission input shaft with circumvention of the hydrodynamic transmission part, particularly of the hydrodynamic speed-torque converter onto the mechanical speed-torque converter upon actuation of the shifting elements in the first gear. The second shifting operation serves to realize the transfer of power via the hydrodynamic speed-torque converter in the second speed and the third shifting operation serves to realize the transfer of power from the transmission input shaft under circumvention of the hydrodynamic speed-torque converter upon actuation of the shifting elements in the second speed. After the fourth shifting operation the transfer of power from the transmission input shaft takes place under circumvention of the hydrodynamic speed-torque converter upon actuation of the shifting elements as in the third speed.

Figure 3B:
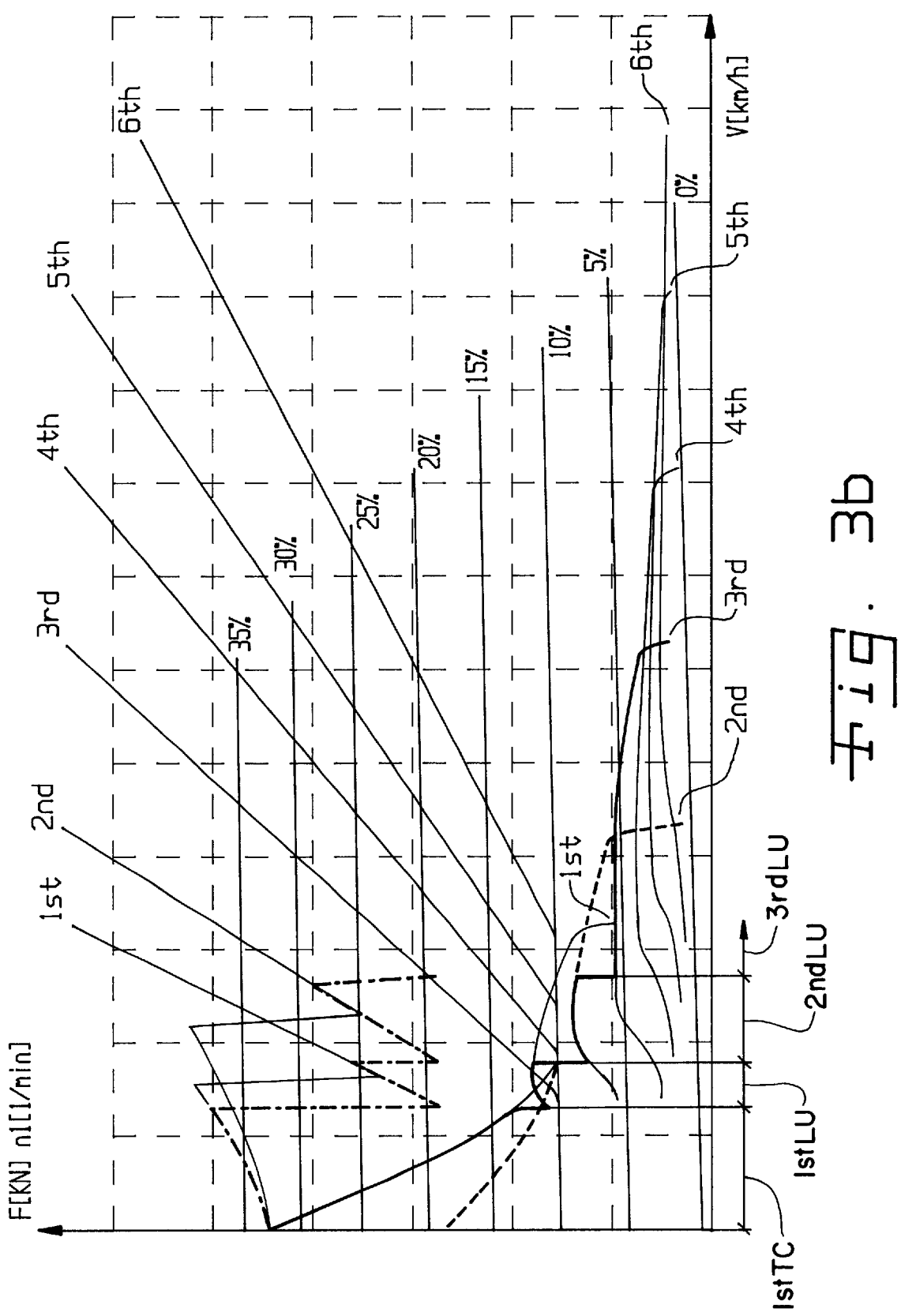

FIG. 3b illustrates a second starting variant with three shifting operations that make possible a thrifty mode of operation of the entire drive train. The transmission of power takes place here at first via the hydrodynamic speed-torque converter upon actuation of the shifting elements on the mechanical speed-torque converter as in the first speed onto the mechanical speed-torque converter (that is, actuation of the shifting elements as in the first speed with the shifting elements of the rear-mounted train being actuated in such a manner that only the greater translation is adjusted). After the transmission of power via the hydrodynamic speed-torque converter the transmission of power from the transmission input shaft takes place by actuation of the converter bridge coupling with circumvention of the hydrodynamic transmission part, in particular of the hydrodynamic speed-torque converter, onto the mechanical speed-torque converter upon actuation of the shifting elements as in the first speed. The second shifting operation serves to realize the transmission of power from the transmission input shaft with circumvention of the hydrodynamic speed-torque converter upon actuation of the shifting elements on the mechanical speed-torque converter as in the second speed. After the third shifting operation the transmission of power from the transmission input shaft takes place with circumvention of the hydrodynamic speed-torque converter upon actuation of the shifting elements on the mechanical speed-torque converter as in the third speed.

Figure 3C:
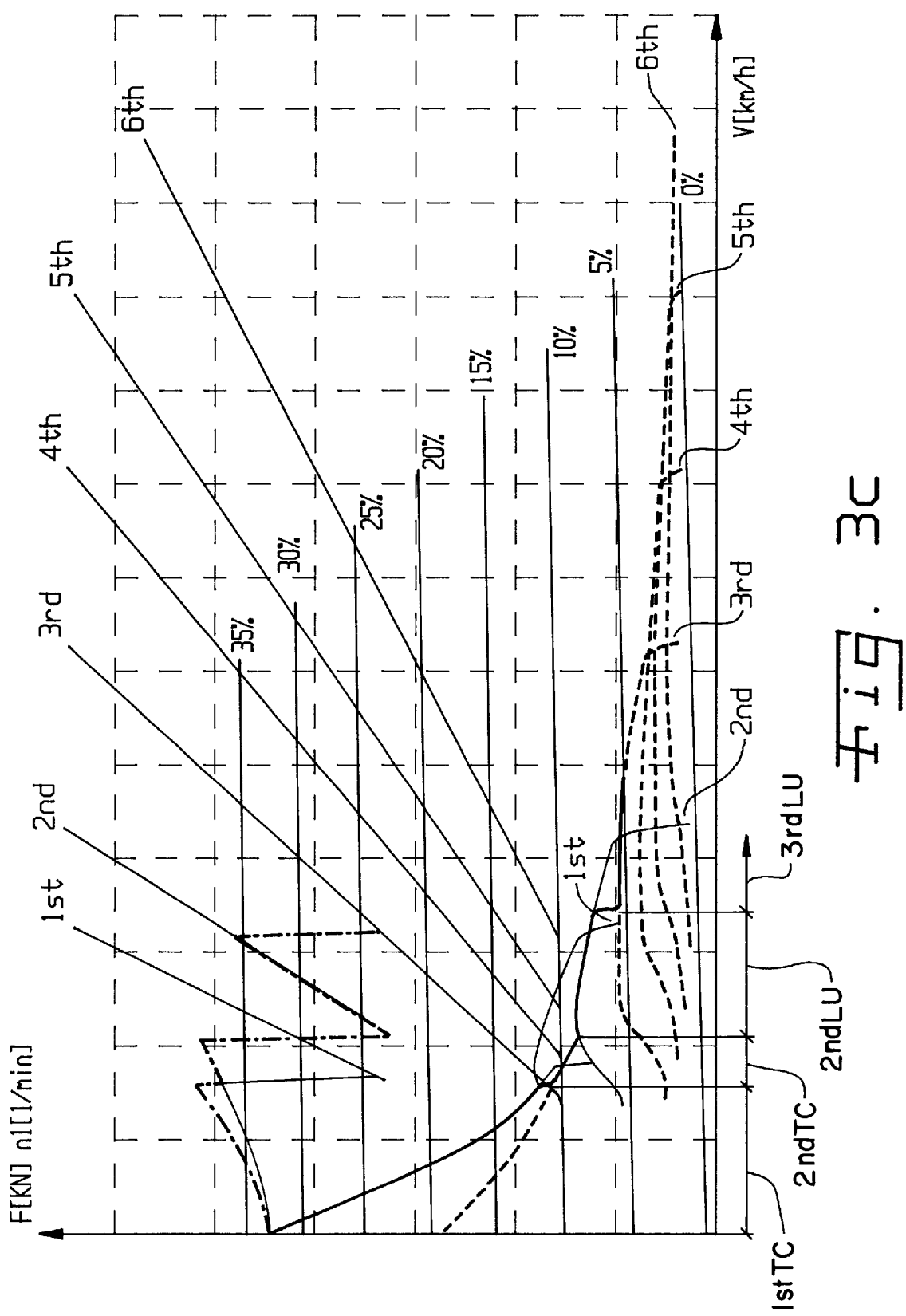

FIG. 3c illustrates the course of tractive force for the third variant with three shifting operations that stands for a special, comfortable starting operation. It is apparent therefrom that the course of tractive force takes place very harmoniously almost without jumps. In order to achieve this the transmission of power is performed via the hydrodynamic speed-torque converter in the first speed onto the mechanical speed-torque converter (that is, actuation of the shifting elements as in the first speed with the shifting elements of the rear-mounted train being actuated in such a manner that only the larger translation is adjusted). After the first shifting operation the power is transmitted via the hydrodynamic speed-torque converter upon actuation of the shifting elements on the mechanical speed-torque converter as in the second speed onto the mechanical speed-torque converter. The second shifting operation serves to realize the transmission of power from the transmission input shaft with circumvention of the hydrodynamic transmission part, in particular of the hydrodynamic speed-torque converter, onto the mechanical speed-torque converter upon actuation of the shifting elements as in the second speed, and the third shifting operation serves to transmit power from the transmission input shaft with circumvention of the hydrodynamic speed-torque converter upon actuation of the shifting elements in the third speed. This starting variant represents a comfortable driving mode.

Figure 3E:
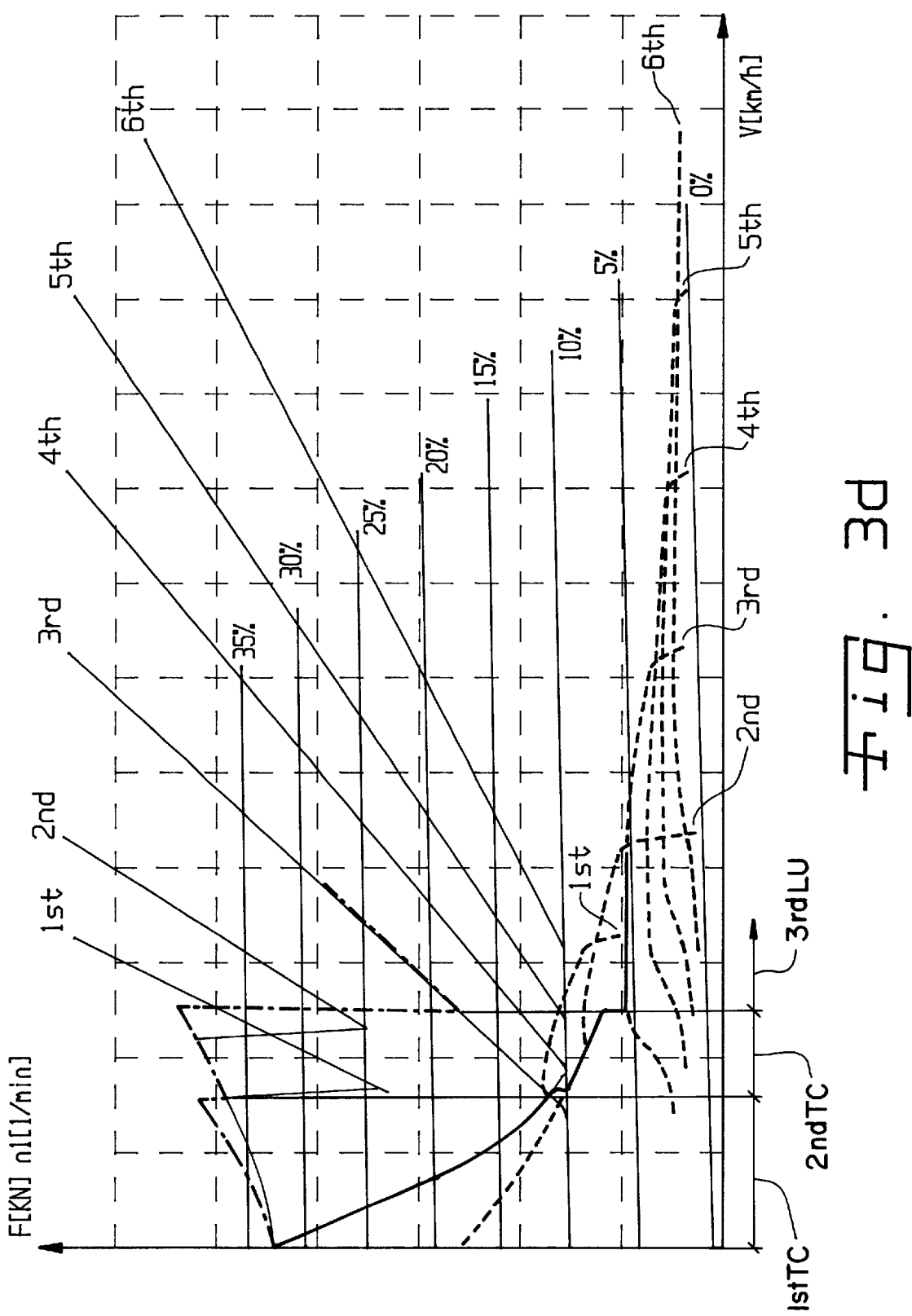
Figure 3E:
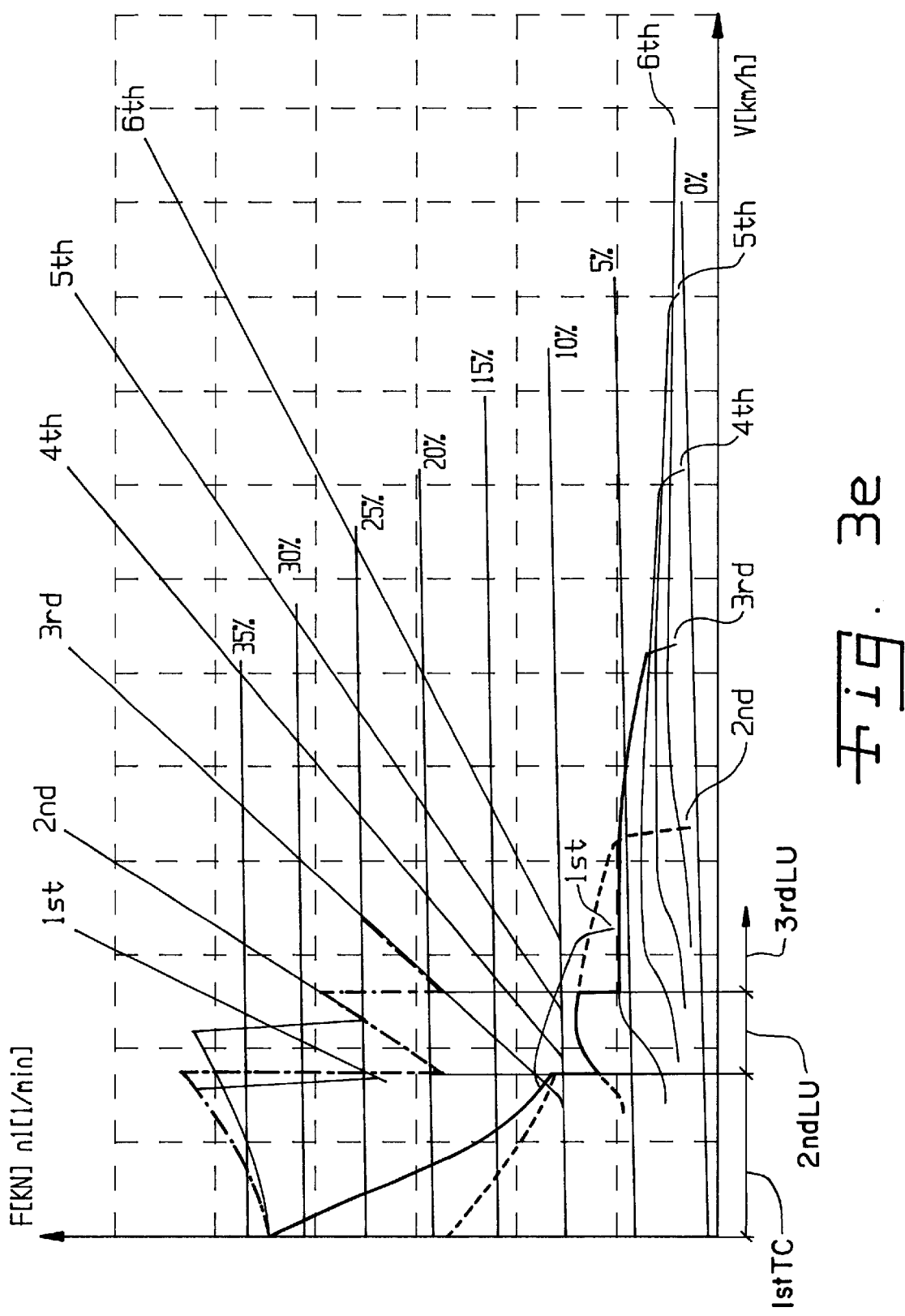

FIGS. 3d and 3e illustrates courses of tractive force for starting concepts with only two shifting operations. In the starting concept according to FIG. 3d ("comfort") the transmission of power takes place at first via the hydrodynamic speed-torque converter in the first speed onto the mechanical speed-torque converter (that is, actuation of the shifting elements as in the first speed, with the shifting elements of the rear-mounted train being actuated in such a manner that only the larger translation is adjusted) and after the first switching operation via the hydrodynamic speed-torque converter in the second speed onto the mechanical speed-torque converter (that is, actuation of the shifting elements as in the second speed, with the shifting elements of the rear-mounted train being actuated in such a manner that only the larger translation is adjusted). The second shifting operation serves to realize the transmission of power from the transmission input shaft with circumvention of the hydrodynamic speed-torque converter upon actuation of the shifting elements in the third speed.

In order to obtain a course of tractive force according to FIG. 3e ("save fuel") the power is first transmitted via the hydrodynamic speed-torque converter in the first speed onto the mechanical speed-torque converter (that is, actuation of the shifting elements as in the first speed, with the shifting elements of the rear-mounted train being actuated in such a manner that only the larger translation is adjusted) and subsequently, after the first shifting operation, under circumvention of the hydrodynamic speed-torque converter upon actuation of the shifting elements in the second speed. Then, after the second shifting operation, the transmission of power takes place from the transmission input shaft with circumvention of the hydrodynamic speed-torque converter upon actuation of the shifting elements in the third speed.

Figure 3F:
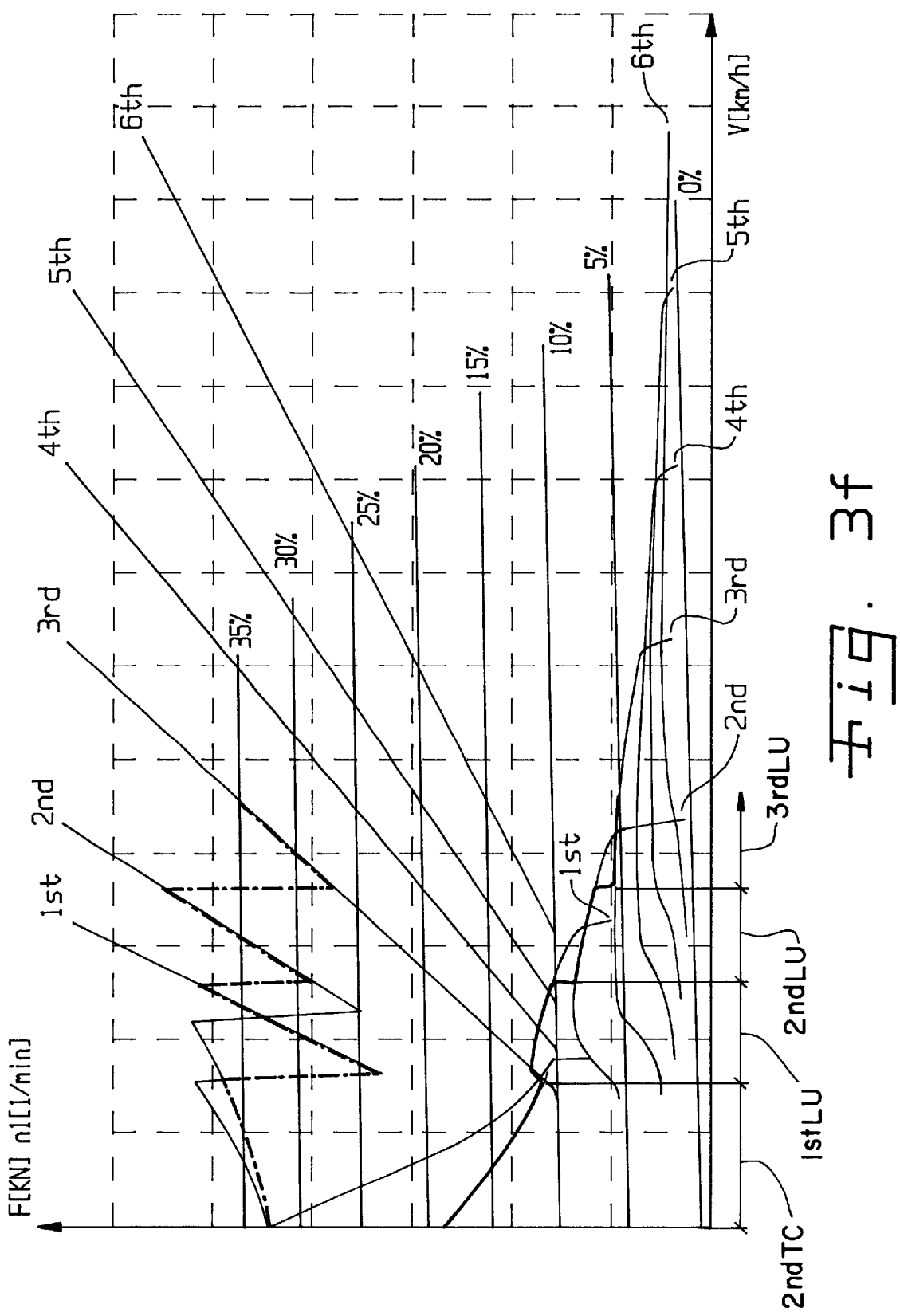
Figure 39:
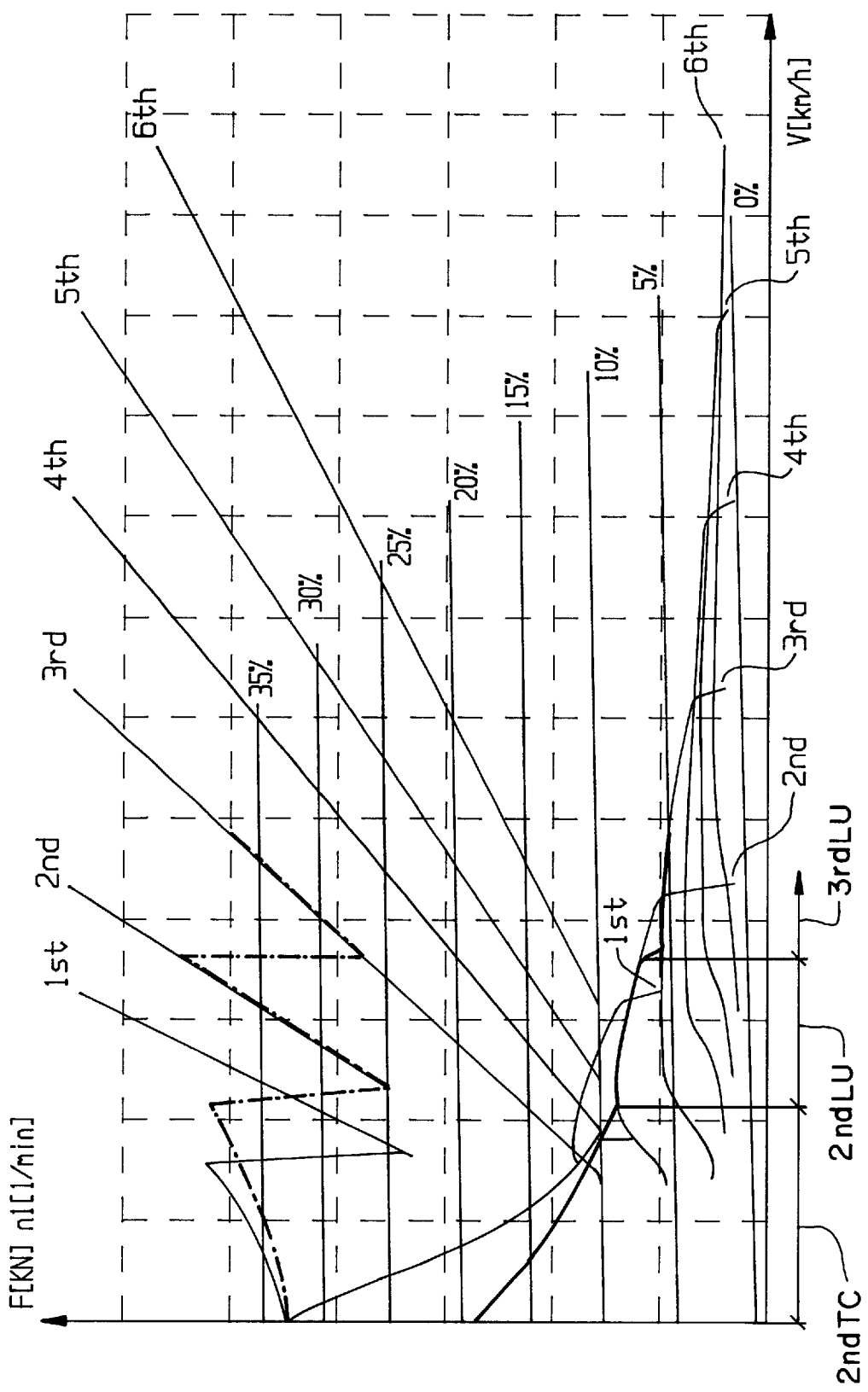

FIG. 3f illustrates the course of tractive force for another starting concept that can also be used as a thrift program with three switching operations. The transmission of power takes place at first thereby via the hydrodynamic speed-torque converter in the second speed onto the mechanical speed-torque converter (that is, actuation of the shifting elements as in the second speed, with the shifting elements of the rear-mounted train being actuated in such a manner that only the larger translation is adjusted) and subsequently from the transmission input shaft with circumvention of the hydrodynamic transmission part, especially of the hydrodynamic speed-torque converter, onto the mechanical speed-torque converter upon actuation of the shifting elements in the first speed. After the second shifting operation the transmission of power takes place from the transmission input shaft with circumvention of the hydrodynamic transmission part, especially of the hydrodynamic speed-torque converter, onto the mechanical speed-torque converter upon actuation of the shifting elements in the second speed, and after the third shifting operation from the transmission input shaft with circumvention of the hydrodynamic speed-torque converter upon actuation of the shifting elements in the third speed.

Figure 3H:
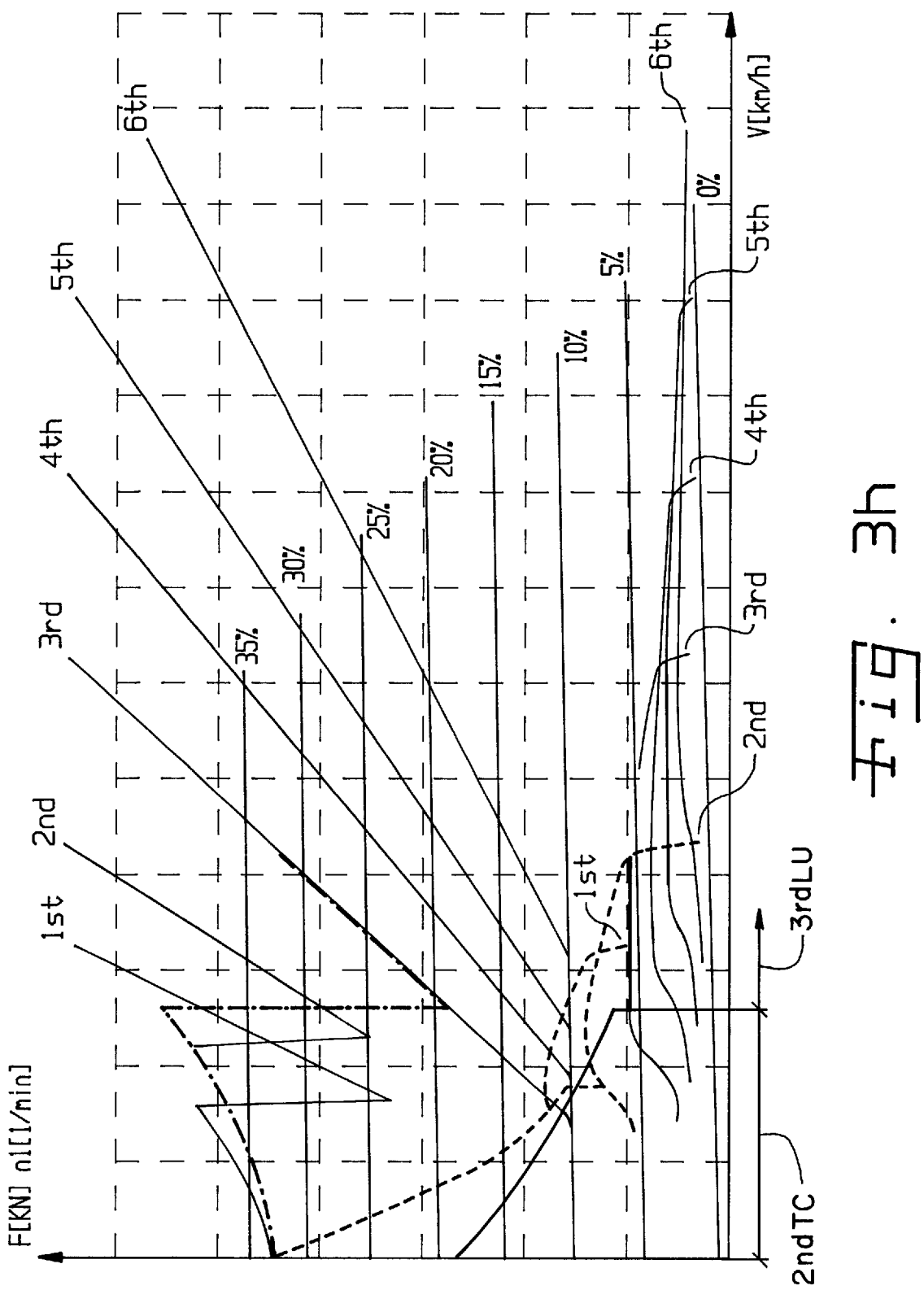

FIGS. 3g and 3h illustrate courses of tractive force for starting concepts with low shifting numbers and the most harmonious course of tractive force possible ("comfort").

In order to obtain a course of tractive force like FIG. 3 the transmission of power takes place via the hydrodynamic speed-torque converter in the second speed onto the mechanical speed-torque converter (that is, actuation of the shifting elements as in the second speed with the shifting elements of the rear-mounted train being actuated in such a manner that only the larger translation is adjusted). The starting takes place so to say in the second converter speed. After the first shifting operation the transmission of power is carried out from the transmission input shaft with circumvention of the hydrodynamic transmission part, in particular of the hydrodynamic speed-torque converter, onto the mechanical speed-torque converter upon actuation of the shifting elements in the second speed and after the second shifting operation with circumvention of the hydrodynamic speed-torque converter upon actuation of the shifting elements in the third speed.

The course of tractive force according to FIG. 3h develops if the transmission of power first takes place via the hydrodynamic speed-torque converter in the second speed onto the mechanical speed-torque converter (that is, actuation of the shifting elements as in the second speed with the shifting elements of the rear-mounted train being actuated in such a manner that only the larger translation is adjusted) and is subsequently transmitted onto the transmission output shaft with circumvention of the hydrodynamic speed-torque converter upon actuation of the shifting elements in the third speed.

Since such multispeed transmissions are automatic transmissions as a rule whose control takes place via a control or regulating device C associated with the transmission, these starting concepts for controlling the individual transmission components can be put in this control or regulating device and are thus made available for selection by the driver. It is particularly interesting to use them when rather small final design speeds are used.

Figure 4A:
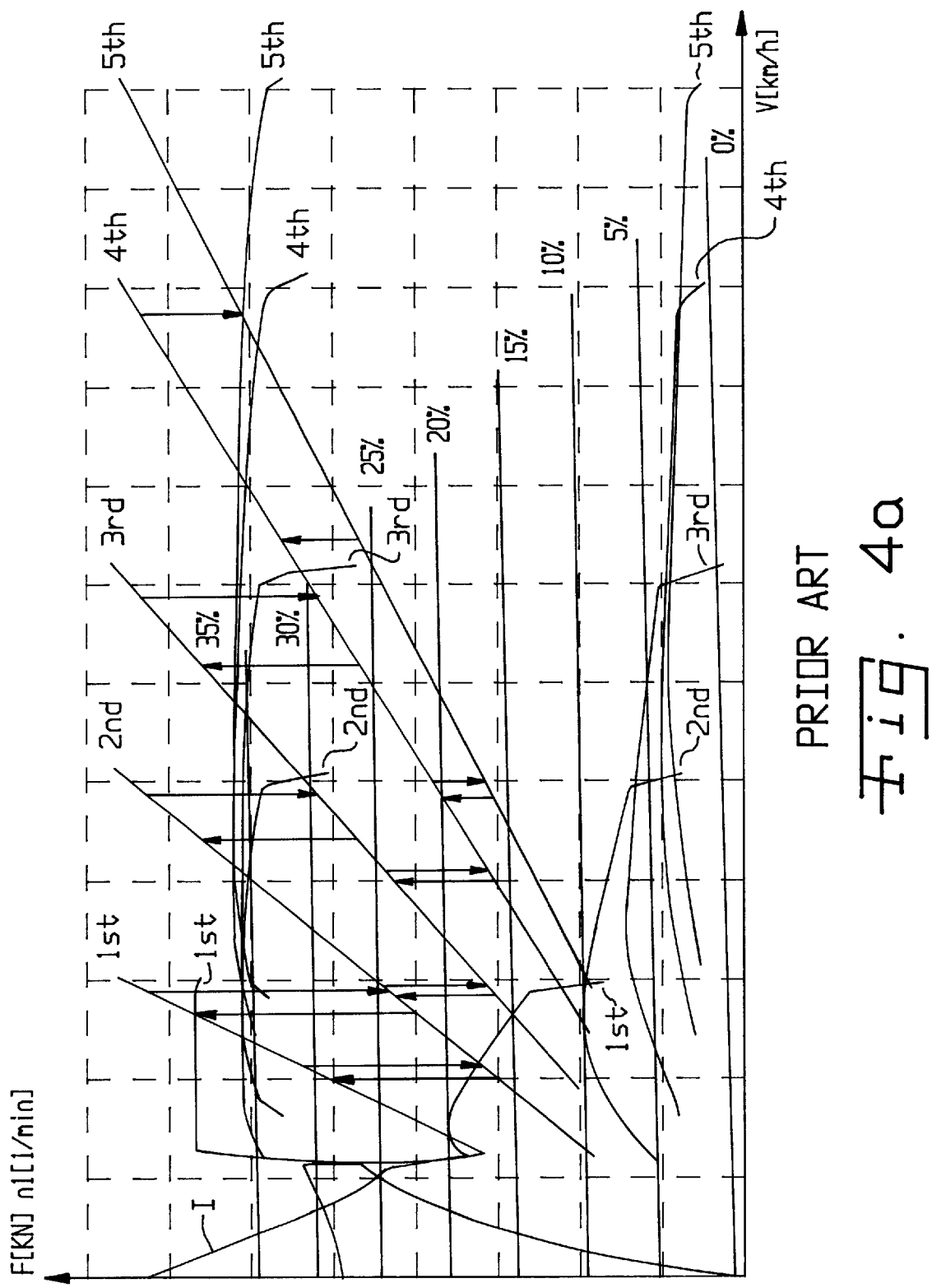
FIGS. 4a and 4b illustrate tractive force diagrams of a conventional multispeed compound transmission for use in overland vehicles (4a) and city vehicles (4b).
Figure 4B:
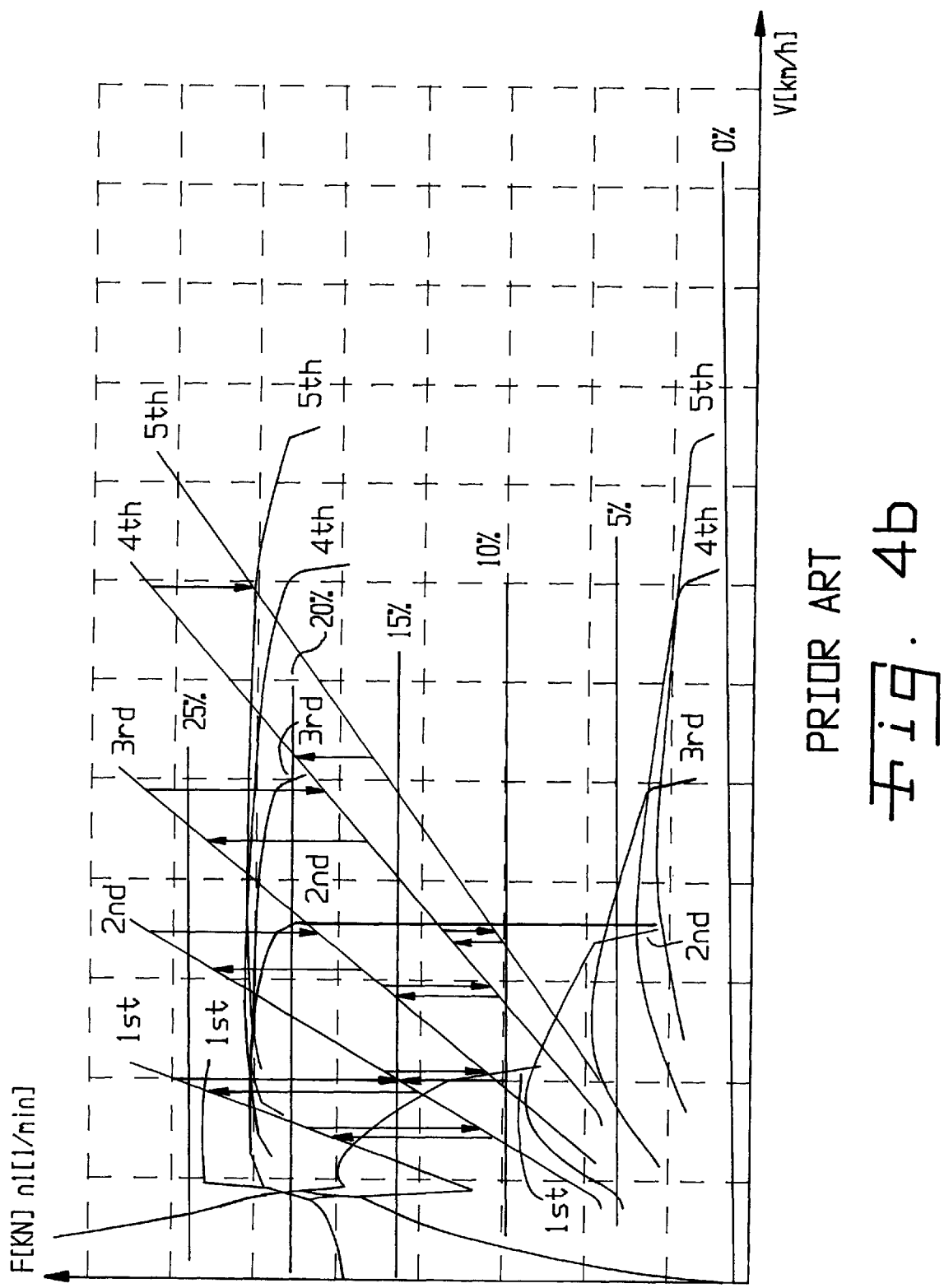
Figure 5A:
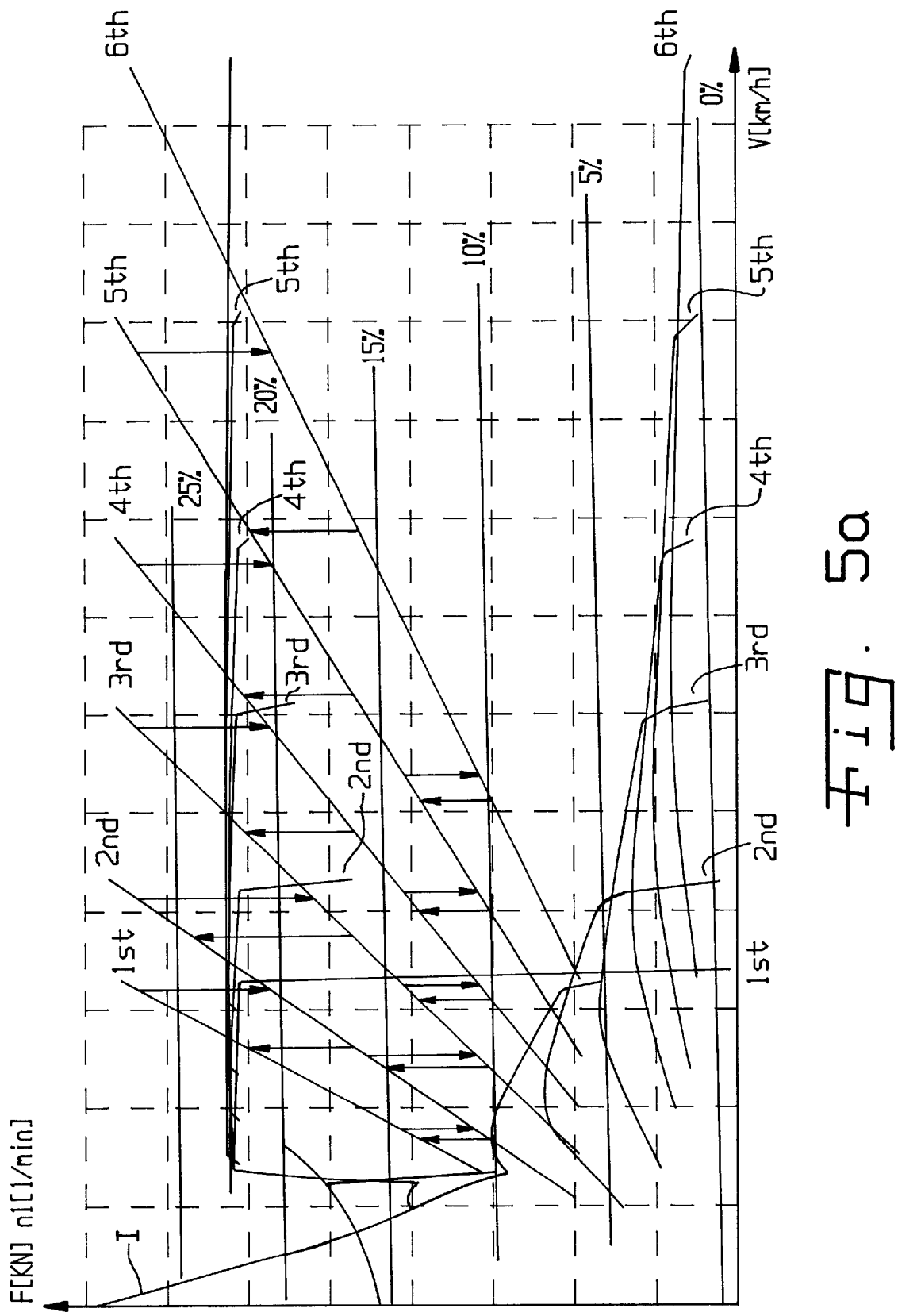
FIGS. 5a and 5b illustrate tractive force diagrams of a multispeed compound transmission shaped and designed in accordance with the invention and designed for use in overland vehicles (5a) and city vehicles (5b).
Figure 5B:
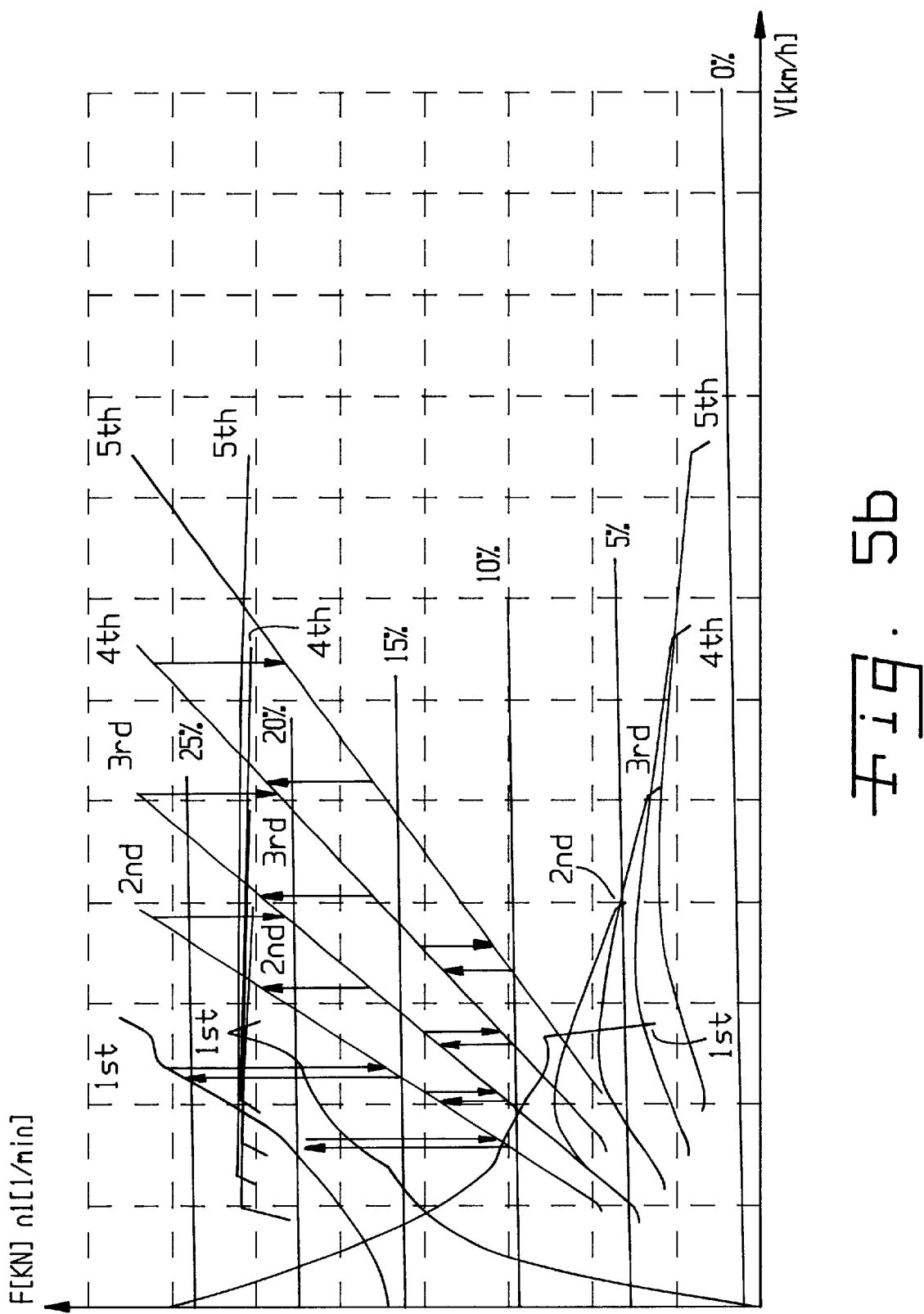

FIGS. 4a, 4b show exemplary diagrams of tractive force I of a conventional multispeed compound transmission for use in overland vehicles (4a) and city vehicles (4b). In contrast thereto, FIGS. 5a, 5b illustrate diagrams of tractive force I of a multispeed compound shaped and designed in accordance with the invention with final speed design for use in overland vehicles (5a) and city vehicles (5b).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrodynamic-mechanical multispeed compound transmission with at least four speeds with a transmission input shaft and a transmission output shaft, said transmission comprising:

a hydrodynamic transmission part and a mechanical transmission part connected in series, viewed in the direction of power flow, with means for circumventing the hydrodynamic transmission part during the transmission of power being provided;

said hydrodynamic transmission part includes at least one hydrodynamic speed-torque converter;

said mechanical transmission part includes a mechanical speed-torque converter device with at least two planetary gear trains, said mechanical transmission part designed in such a manner that a translation in the theoretically possible and successive gear steps that can be used cause gear step jumps, each said gear step jump representing a gear step increase from one gear step to a higher gear step, each said gear step jump having a gear translation ratio between said gear steps associated therewith, said gear translation ratio being defined as phi, phi$\leq$1.45 associated with each said gear step jump where the gear steps theoretically directly follow one another, said mechanical transmission part further including a mechanical rear-mounted train, the output of said mechanical speed-torque converter being coupled to the input of the mechanical rear-mounted train, said rear mounted train comprising at least one planetary gear train including a sun gear, an internal-geared wheel, planet gears, and a planet carrier, the first transmission element of the first planetary gear train and the first transmission element of the second planetary gear train as well as the input of the rear-mounted train being formed in each instance by a web of the planetary gear trains; and a coupling between the first transmission element of the first planetary gear train and the first transmission element of the second planetary gear train of the mechanical speed-torque converter device, said coupling forming the output of the mechanical speed-torque converter device, said coupling being coupled to the input of the rear-mounted train.

2. The hydrodynamic-mechanical compound transmission according to claim 1, in which said mechanical transmission part comprises at least six gear steps that can be theoretically realized, said mechanical transmission part designed such that a mechanical translation in the individually, theoretically possible gear steps bring about gear step jumps of phi$\leq$1.45 between the first and the second gear step as well as between the second and the third gear step and of phi$\leq$1.25 between two successive gear steps of the following gears.

3. The hydrodynamic-mechanical compound transmission according to claim 1, in which i=effective gear translation for a given gear step, said mechanical transmission part including transmission elements participating in a speed-torque conversion, said transmission elements realizing a translation in the range of 3<i<3.25 in the first gear step and a translation in the range of 0.7<i<0.9 in the last gear step.

4. The hydrodynamic-mechanical compound transmission according to claim 1, in which said hydrodynamic speed-torque converter comprises two stator devices.

5. The hydrodynamic-mechanical compound transmission according to claim 1, including means for an at least indirect coupling of a further, second element of the first planetary gear train and of a further, second element of the second planetary gear set to the transmission input shaft.

6. The hydrodynamic-mechanical compound transmission according to claim 5, in which said means for an at least indirect coupling of the further, second element of the first planetary gear train and of the further, second element of the second planetary gear train to the transmission input shaft includes a coupling device for coupling the second transmission element of the first planetary gear train to the second transmission element of the second planetary gear train.

7. The hydrodynamic-mechanical compound transmission according to claim 5, in which said means for an at least indirect coupling of a further, second element of the first planetary gear train and of a further, second element of the second planetary gear train to the transmission input shaft includes a further coupling device for the selective coupling of the second element of the second planetary gear train to the transmission input shaft.

8. The hydrodynamic-mechanical compound transmission according to claim 5, in which the second transmission element of the first planetary gear train can be connected to a first stator of the hydrodynamic speed-torque converter via a freewheel in such a manner that it rotates in unison with said stator.

9. The hydrodynamic-mechanical compound transmission according to claim 5, in which said second transmission element of the first planetary gear train is formed by a sun gear of the first planetary gear train and that the second element of the second planetary gear train is formed by a sun gear of the second planetary gear train.

10. The hydrodynamic-mechanical compound transmission according to claim 4, in which a second stator of the hydrodynamic speed-torque converter is coupled via a freewheel to the transmission housing.

11. The hydrodynamic-mechanical compound transmission according to claim 1, in that shifting devices in the form of selective couplings and braking devices are associated with said mechanical speed-torque converter and said rear-mounted train.

12. The hydrodynamic-mechanical compound transmission according to claim 11, in that the second element of the first planetary gear train of the mechanical speed-torque converter can be braked by a first braking device.

13. The hydrodynamic-mechanical compound transmission according to claim 12, in that a third element of the first planetary gear train of the mechanical speed-torque converter can be braked by a second braking device.

14. The hydrodynamic-mechanical compound transmission according to claim 13, in that a third transmission element of the second planetary gear train of the mechanical speed-torque converter can be braked by a third braking device.

15. The hydrodynamic-mechanical compound transmission according to claim 14, having a further, fourth braking device and a further, second coupling device are associated with the planetary gear train of the rear-mounted train;

said fourth braking device coupled to the sun gear of the planetary gear train of the rear-mounted train; and said second coupling device serves to couple the sun gear to the planet to the carrier of the planetary gear train of the rear-mounted train.

16. The hydrodynamic-mechanical compound transmission according to claim 11, in that the shifting devices designed as braking devices and/or coupling devices are designed with a laminar construction.

17. The hydrodynamic-mechanical compound transmission according to claim 1, in that a control device is provided to control said transmission.

18. The hydrodynamic-mechanical compound transmission according to claim 1, in which a control device is coupled to a plurality of positioning members for an at least indirect control of individual shifting elements.

19. The hydrodynamic-mechanical compound transmission according to claim 18, in which said control device has an input that can be coupled to a device for selecting a shifting plan that is characterized by the actuation of the individual shifting elements in the appropriate sequence, and said control device comprises means for forming a regulated quantity for controlling the shifting elements.

20. The hydrodynamic-mechanical compound transmission according to claim 19, in which said means is a programmed routine.

* * * * *